US012148421B2

(12) United States Patent
Baeuml et al.

(10) Patent No.: US 12,148,421 B2
(45) Date of Patent: Nov. 19, 2024

(54) USING LARGE LANGUAGE MODEL(S) IN GENERATING AUTOMATED ASSISTANT RESPONSE(S

(71) Applicant: GOOGLE LLC, Mountain View, CA (US)

(72) Inventors: Martin Baeuml, Zurich (CH); Thushan Amarasiriwardena, Alameda, CA (US); Roberto Pieraccini, Zurich (CN); Vikram Sridar, Zurich (CH); Daniel De Freitas Adiwardana, San Francisco, CA (US); Noam M. Shazeer, Palo Alto, CA (US); Quoc Le, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 301 days.

(21) Appl. No.: 17/532,794

(22) Filed: Nov. 22, 2021

(65) Prior Publication Data
US 2023/0074406 A1 Mar. 9, 2023

Related U.S. Application Data

(60) Provisional application No. 63/241,232, filed on Sep. 7, 2021.

(51) Int. Cl.
G10L 15/22 (2006.01)
G06F 16/9032 (2019.01)
G10L 15/183 (2013.01)

(52) U.S. Cl.
CPC ...... *G10L 15/183* (2013.01); *G06F 16/90332* (2019.01); *G10L 15/22* (2013.01)

(58) Field of Classification Search
CPC .. G10L 15/183; G10L 15/22; G06F 16/90332
(Continued)

(56) References Cited

U.S. PATENT DOCUMENTS

2015/0382047 A1* 12/2015 Van Os ............ H04N 21/25891
725/38
2020/0294497 A1* 9/2020 Kirazci ................. G10L 13/027
(Continued)

FOREIGN PATENT DOCUMENTS

WO 2020139408 7/2020

OTHER PUBLICATIONS

Zheng, Y. et al., "Personalized Dialogue Generation with Diversified Traits" arXiv.org, arXiv:1901.09672v1; 12 pages; dated Jan. 28, 2019.
(Continued)

Primary Examiner — Pierre Louis Desir
Assistant Examiner — Fouzia Hye Solaiman
(74) Attorney, Agent, or Firm — Gray Ice Higdon

(57) ABSTRACT

As part of a dialog session between a user and an automated assistant, implementations can receive a stream of audio data that captures a spoken utterance including an assistant query, determine, based on processing the stream of audio data, a set of assistant outputs that are each predicted to be responsive to the assistant query, process, using large language model (LLM) output(s), the assistant outputs and context of the dialog session to generate a set of modified assistant outputs, and cause given modified assistant output, from among the set of modified assistant outputs, to be provided for presentation to the user in response to the spoken utterance. In some implementations, the LLM output(s) can be generated in an offline manner for subsequent use in an online manner. In additional or alternative implementations, the LLM output(s) can be generated in an online manner when the spoken utterance is received.

17 Claims, 7 Drawing Sheets

(58) Field of Classification Search
USPC .......................................................... 704/270
See application file for complete search history.

(56) References Cited

U.S. PATENT DOCUMENTS

| | | | |
|---|---|---|---|
| 2021/0280180 A1* | 9/2021 | Skobeltsyn | ....... G06F 16/90332 |
| 2023/0037085 A1* | 2/2023 | Biadsy | ................ G10L 15/1815 |
| 2023/0046658 A1* | 2/2023 | Bowers | ................ G10L 13/033 |

OTHER PUBLICATIONS

Ma, Y. et al., "A Survey on Empathetic Dialogue Systems"; Information Fusion, vol. 64; pp. 50-70; dated Jun. 25, 2020.
European Patent Office; Invitation to Pay Additional Fees issued in Application No. PCT/US2021/061214; 13 pages; dated Jun. 21, 2022.
European Patent Office; International Search Report and Written Opinion issued in Application No. PCT/US2021/061214; 20 pages; dated Aug. 11, 2022.
Australian Patent Office; Examination Report issued in Application No. 2021463794; 4 pages; dated Aug. 15 2024.
Australian Patent Office; Notice of Acceptance issued in Application No. 2021463794; 3 pages; dated Aug. 27, 2024.
European Paten Office; Communication pursuant to Article 94(3) EPC issued in Application No. 21835476.9; 5 pages; dated Sep. 12, 2024.

\* cited by examiner

USING LARGE LANGUAGE MODEL(S) IN GENERATING AUTOMATED ASSISTANT RESPONSE(S

BACKGROUND

Humans may engage in human-to-computer dialogs with interactive software applications referred to herein as "automated assistants" (also referred to as "chatbots," "interactive personal assistants," "intelligent personal assistants," "personal voice assistants," "conversational agents," etc.). Automated assistants typically rely upon a pipeline of components in interpreting and responding to spoken utterances. For example, an automatic speech recognition (ASR) engine can process audio data that corresponds to a spoken utterance of a user to generate ASR output, such as ASR hypotheses (i.e., sequence of term(s) and/or other token(s)) of the spoken utterance. Further, a natural language understanding (NLU) engine can process the ASR output (or touch/typed input) to generate NLU output, such as an request (e.g., intent) expressed by the user in providing the spoken utterance (or the touch/typed input) and optionally slot value(s) for parameter(s) associated with the intent. Eventually, the NLU output can be processed by various fulfillment components to generate fulfillment output, such as responsive content that is responsive to the spoken utterance and/or one or more actions that can be performed responsive to the spoken utterance.

Generally, a dialog session with an automated assistant is initiated by a user providing a spoken utterance, and the automated assistant can respond to the spoken utterance using the aforementioned pipeline of components. The user can continue the dialog session by providing an additional spoken utterance, and the automated assistant can respond to the additional spoken utterance again using the aforementioned pipeline of components. Put another way, these dialog sessions are generally turn-based in that the user takes a turn in the dialog session to provide a spoken utterance, the automated assistant takes a turn in the dialog session to respond to the spoken utterance, the user takes an additional turn in the dialog session to provide an additional spoken utterance, the automated assistant takes an additional turn in the dialog session to respond to the additional spoken utterance, and so on. However, from a perspective of the user, these turn-based dialog sessions may not be natural since they do not reflect how humans actually converse with one another.

For example, if a first human provides a spoken utterance to convey an initial thought to a second human (e.g., "I'm going to the beach today") during a dialog session, the second human can consider the spoken utterance in the context of the dialog session in formulating a response to the first human (e.g., "sounds fun, what are you going to do at the beach?", "nice, have you looked at the weather?", etc.). Notably, the second human, in responding to the first human, can provide a spoken utterance that keeps the first human engaged in the dialog session in a natural manner. Put another way, during the dialog session, both the first human and the second human can provide spoken utterances in furtherance of a natural conversation and without one of the humans driving the dialog session.

However, if the second human is replaced with an automated assistant in the above example, the automated assistant may not provide a response that keeps the first human engaged in the dialog session. For instance, in response to the first human providing a spoken utterance of "I'm going to the beach today", the automated assistant may simply respond "sounds fun" or "nice" without providing any additional response in furtherance of the dialog session and despite the automated assistant being able to perform some action and/or provide some response in furtherance of the dialog session, such as proactively asking the first human what they intend to do at the beach, proactively looking up a weather forecast for a beach the first human often visits and including the weather forecast in the response, proactively making some inference based on the weather forecast, etc. As a result, the responses provided by the automated assistant in response to the spoken utterance of the first human may not resonate with the first human since the response may not reflect a natural conversation between multiple humans. Further, the first human may have to provide additional spoken utterances to explicitly request certain information (e.g., the weather forecast for the beach) that the automated assistant may proactively provide, thereby increasing a quantity of spoken utterances directed to the automated assistant and wasting computational resources of a client device utilized in processing these spoken utterances.

SUMMARY

Implementations described herein are directed to enabling an automated assistant to perform natural conversations with a user during a dialog session. Some implementations can receive a stream of audio data that captures a spoken utterance of the user. The stream of audio data may be generated by one or more microphones of the client device, and the spoken utterance may include an assistant query. Some implementations can further determine, based on processing the stream of audio data, a set of assistant outputs, and process the set of assistant outputs and context of the dialog session to generate a set of modified assistant outputs using one or more large language model (LLM) outputs generated using an LLM. Each of the one or more LLM outputs may be determined based on at least part of the context of the dialog session and one or more of the assistant outputs included in the set of assistant outputs. Some implementations can further cause a given modified assistant output, from among the set of modified assistant outputs, to be provided for presentation to the user. Further, each of the one or more LLM outputs can include, for example, a probability distribution over a sequence of one or more words and/or phrases across one or more vocabularies, and one or more of the words and/or phrases in the sequence can be selected as the one or more LLM outputs based on the probability distribution. Moreover, the context of the dialog session can be determined based on one or more contextual signals that include, for example, a time of day, a day of week, a location of the client device, ambient noise detected in an environment of the client device, user profile data, software application data, environmental data about a known environment of the user of the client device, dialog history of the dialog session between the user and the automated assistant, and/or other contextual signals.

In some implementations, the set of assistant outputs can be determined based on processing the stream of audio data, using a streaming automatic speech recognition (ASR) model, to generate a stream of ASR output, such as one or more recognized terms or phrases that are predicted to correspond to the spoken utterance, one or more phonemes that are predicted to correspond to the spoken utterance, one or more predicted measures that are associated with each of the one or more recognized terms or phrases and/or the one or more predicted phonemes, and/or other ASR output.

Further, the ASR output can be processed, using a natural language understanding (NLU) model, to generate a stream of NLU output, such as one or more predicted intents of the user in providing the spoken utterance and one or more corresponding slot values for one or more parameters associated with each of the one or more predicted intents. Moreover, the stream of NLU data can be processed by one or more first-party (1P) and/or third-party (3P) systems to generate the set of assistant outputs. As used herein, the one or more 1P systems include systems that are developed and/or maintained by a same entity that develops and/or maintains the automated assistant described herein (e.g., a common publisher), whereas the one or more 3P systems include systems that are developed and/or maintained by a distinct entity from the entity that develops and/or maintains the automated assistant described herein. Notably, the set of assistant outputs described herein include assistant outputs that are typically considered for responding to spoken utterances. However, by using claimed techniques, the set of assistant outputs generated in the manner described above can be further processed to generate a set of modified assistant outputs. In particular, the set of assistant outputs can be modified using one or more LLM outputs, and given modified assistant outputs can be selected, from the set of modified assistant outputs, to be provided for presentation to the user in response to receiving the spoken utterance.

For example, assume a user of a client device provides a spoken utterance of "Hey Assistant, I'm thinking about going surfing today". In this example, the automated assistant can process the spoken utterance in the manner described above to generate the set of assistant outputs and the set of modified assistant outputs. The assistant outputs included in the set of assistant outputs in this example may include, for instance, "That sounds like fun!", "Sounds fun!", or the like. Further, the assistant outputs included in the set of modified assistant outputs in this example may include, for instance, "That sounds like fun, how long have you been surfing?", "Enjoy it, but if you're going to Example Beach again, be prepared for some light showers", or the like. Notably, the assistant outputs included in the set of assistant outputs fail to include any assistant outputs that drive the dialog session in manner that further engages the user of the client device in the dialog session, but the assistant outputs included in the set of modified assistant outputs include assistant outputs that do drive the dialog session in manner that further engages the user of the client device in the dialog session by asking contextually relevant questions (e.g., "how long have you been surfing?"), that provide contextually relevant information (e.g., "but if you're going to Example Beach again, be prepared for some light showers"), and/or that otherwise resonate with the user of the client device within the context of the dialog session.

In some implementations, the set of modified assistant responses can be generated using one or more LLM outputs that are generated in an online manner. For example, in response to receiving the spoken utterance, the automated assistant can cause the set of assistant outputs to be generated in the manner described above. Further, and also in response to receiving the spoken utterance, the automated assistant can cause the set of assistant outputs, the context of the dialog session, and/or the assistant query that is included in the spoken utterance to be processed, using one or more LLMs, to generate the set of modified assistant outputs based on one or more LLM outputs generated using the one or more LLMs.

In additional or alternative implementations, the set of modified assistant responses can be generated using one or more LLM outputs that are generated in an offline manner. For example, prior to receiving the spoken utterance, the automated assistant can obtain a plurality of assistant queries and a corresponding context of a corresponding prior dialog session for each of the plurality of assistant queries from an assistant activity database (that may be limited assistant activity of the user of the client device). Further, the automated assistant can cause, for a given assistant query of the plurality of assistant queries, the set of assistant outputs to be generated in the manner described above and for the given assistant query. Moreover, the automated assistant can cause the set of assistant outputs, the corresponding context of the dialog session, and/or the given assistant query to be processed, using one or more LLMs, to generate the set of modified assistant outputs based on one or more LLM outputs generated using the one or more LLMs. This process can be repeated for each of the plurality of queries and the corresponding contexts of the prior dialog sessions that are obtained by the automated assistant.

Additionally, the automated assistant can index the one or more LLM outputs in memory that is accessible by the client device of the user. In some implementations, the automated assistant can cause the one or more LLMs to be indexed in the memory based on one or more terms that are included in the plurality of assistant queries. In additional or alternative implementations, the automated assistant can generate a corresponding embedding for each of the plurality of assistant queries (e.g., a word2vec embedding, or another lower-dimensional representation), and map each of the corresponding embeddings to an assistant query embedding space to index the one or more LLM outputs. In additional or alternative implementations, the automated assistant can cause the one or more LLMs to be indexed in the memory based on one or more contextual signals included in the corresponding prior contexts. In additional or alternative implementations, the automated assistant can generate a corresponding embedding for each of the corresponding contexts, and map each of the corresponding embeddings to a context embedding space to index the one or more LLM outputs. In additional or alternative implementations, the automated assistant can cause the one or more LLMs to be indexed in the memory based on one or more terms or phrases of the assistant outputs included in the set of assistant outputs for each of the plurality of assistant queries. In additional or alternative implementations, the automated assistant can generate a corresponding embedding for each of the assistant outputs included in the set of assistant outputs (e.g., a word2vec embedding, or another lower-dimensional representation), and map each of the corresponding embeddings to an assistant outputs embedding space to index the one or more LLM outputs.

Accordingly, when a spoken utterance is subsequently received at the client device of the user, the automated assistant can identity the one or more LLM outputs that were previously generated based on a current assistant query corresponding to one or more of the assistant queries included in the plurality of queries, a current context corresponding to one or more of the corresponding prior contexts, and/or one or more current assistant outputs corresponding to one or more of the prior assistant outputs. For example, in implementations where the one or more LLM outputs are indexed based on corresponding embeddings for the prior assistant query, the automated assistant can cause an embedding for the current assistant query to be generated and mapped to the assistant query embedding space. Further, the automated assistant can determine that the current assistant query corresponds to the prior assistant query based on a distance, in the query embedding space, between the embedding for the current assistant query and the corresponding embedding for the prior assistant query satisfying a threshold. The automated assistant can obtain, from the memory, the one or more LLM outputs generated based on processing the prior assistant query, and utilize the one or more LLM outputs in generating the set of modified assistant outputs. Also, for example, in implementations where the one or more LLMs are indexed based on one or more terms that are included in the plurality of assistant queries, the automated assistant can determine, for instance, an edit distance between the current assistant query and the plurality of prior assistant queries to identify the prior assistant query that corresponds to the current assistant query. Similarly, the automated assistant can obtain, from the memory, the one or more LLM outputs generated based on processing the prior assistant query, and utilize the one or more LLM outputs in generating the set of modified assistant outputs.

In some implementations, and in addition to the one or more LLM outputs, an additional assistant query can be generated based on processing the assistant query and/or the context of the dialog session. For example, in processing the assistant query and/or the context of the dialog session, the automated assistant can determine an intent associated with the given assistant query based on the stream of NLU data. Further, the automated assistant can identify, based on the intent associated with the given assistant query, at least one related intent that is related to the intent associated with the assistant query (e.g., based on a mapping of the intent to the at least one related intent in a database or memory accessible to the client device and/or based on processing the intent associated with the given assistant query using one or more machine learning (ML) models or heuristically defined rules). Moreover, the automated assistant can generate the additional assistant query based on the at least one related intent. For example, assume the assistant query indicates that a user is going to the beach (e.g., "Hey assistant, I'm going to the beach today"). In this example, the additional assistant query can correspond to, for example, "what's the weather at Example Beach?" (e.g., to proactively determine weather information at a beach the user typically visits named Example Beach). Notably, the additional assistant query may not be provided for presentation to the user of the client device.

Rather, in these implementations, additional assistant output can be determined based on processing the additional assistant query. For example, the automated assistant can transmit a structured request to one or more 1P and/or 3P systems to obtain the weather information as the additional assistant output. Further assume that the weather information indicates that Example Beach is expecting rain. In some versions of these implementations, the automated assistant can further cause the additional assistant to be processed using one or more of the LLM outputs and/or one or more additional LLM outputs to generate an additional set of modified assistant outputs. Accordingly, in the initial example provided above, given modified assistant output, from the initial set of modified assistant outputs, that is provided to the user in response to receiving the spoken utterance of "Hey Assistant, I'm thinking about going surfing today" may be "Enjoy it", and given additional modified assistant output, from the additional set of modified assistant outputs, may be "but if you're going to Example Beach again, be prepared for some light showers". Put another way, the automated assistant In various implementations, in generating the set of modified assistant outputs, each of the one or more LLM outputs utilized can be generated using a corresponding set of parameters of a plurality of disparate sets of parameters. Each of the plurality of disparate sets of parameters can be associated with disparate personalities for the automated assistant. In some versions of those implementations, a single LLM can be utilized to generate the one or more corresponding LLM outputs using the corresponding sets of parameters for each of the disparate personalities, whereas in other versions of those implementations, multiple LLMs can be utilized to generate the one or more corresponding LLM outputs using the corresponding sets of parameters for each of the disparate personalities. Accordingly, when given modified assistant outputs, from the set of modified assistant outputs, is provided for presentation to the user, it can reflect various dynamic contextual personalities via prosodic properties of different personalities (e.g., intonation, cadence, pitch, pause, tempo, stress, rhythm, etc. of these different personalities).

Notably, these personality replies described herein not only reflect the prosodic properties of the different personalities, but can also reflect disparate vocabularies of the different personalities and/or disparate speaking styles of the different personalities (e.g., a verbose speaking style, a terse speaking style, etc.). For example, the given modified assistant output provided for presentation to the user can be generated using a first set of parameters that reflect a first personality of the automated assistant in terms of a first vocabulary to be utilized by the automated assistant and/or a first set of prosodic properties to be utilized in providing the modified assistant output for audible presentation to the user. Alternatively, the modified assistant output provided for presentation to the user can be generated using a second set of parameters that reflect a second personality of the automated assistant in terms of a second vocabulary to be utilized by the automated assistant and/or a second set of prosodic properties to be utilized in providing the modified assistant output for audible presentation to the user.

Accordingly, the automated assistant can dynamically adapt the personalities utilized in providing the modified assistant outputs for presentation to the user based on both the vocabulary utilized by the automated assistant and the prosodic properties utilized in rendering the modified assistant outputs for audible presentation to the user. Notably, the automated assistant can dynamically adapt these personalities utilized in providing the modified assistant outputs based on the context of the dialog session, including prior spoken utterances received from the user and prior assistant outputs provided by the automated assistant and/or any other contextual signals described herein. As a result, the modified assistant outputs provided by the automated assistant may better resonate with the user of the client device. Moreover, it should be noted that the personality used throughout a given dialog session can be dynamically adapted as the context of the given dialog session is updated.

In some implementations, the automated assistant may rank the assistant outputs included in the set of assistant outputs (i.e., not generated using the one or more LLM outputs) and the of modified assistant outputs (i.e., generated using the one or more LLM outputs) according to one or more ranking criteria. Accordingly, in selecting the given assistant output to be provided for presentation to the user, the automated assistant can select from among both the set of assistant outputs and the set of modified assistant outputs. The one or more ranking criteria can include, for example, one or more predicted measures (e.g., ASR measures generated in generating the stream of ASR output, NLU measures generated in generating the stream of NLU output, fulfillment measures generated in generating the set of assistant outputs) that are indicative of how responsive each of the assistant outputs included in the set of assistant outputs and the set of modified assistant outputs are predicted to be to the assistant query included in the spoken utterance, one or more intents included in the stream of NLU output, and/or other ranking criteria. For example, if an intent of the user of the client device indicates the user would like a factual answer (e.g., based on providing a spoken utterance that includes an assistant query of "why is the sky blue?"), then the automated assistant can promote one or more of the assistant outputs included in the set of one or more assistant outputs since it is likely that the user would like a straightforward answer to the assistant query. However, if an intent of the user of the client device indicates the user provided more open-ended input (e.g., based on providing a spoken utterance that includes an assistant query of "what time is it?"), then the automated assistant can promote one or more of the assistant outputs included in the set of modified assistant outputs since it is likely that the user would prefer more conversational aspects.

In some implementations, and prior to generating the set of modified assistant outputs, the automated assistant may determine whether to even generate the set of modified assistant outputs. In some versions of those implementations, the automated assistant may determine whether to even generate the set of modified assistant outputs based on one or more of the predicted intents of the user in providing the spoken utterance as indicated by the stream of NLU data. For example, in implementations where the automated assistant determines that the spoken utterance requests the automated assistant to perform a search (e.g., an assistant query of "Why is the sky blue?"), then the automated assistant may determine not to generate the set of modified assistant outputs since the user is seeking a factual answer. In additional or alternative versions of those implementations, the automated assistant may determine whether to even generate the set of modified assistant outputs based on one or more computational costs associated with modifying one or more of the assistant outputs. The one or more computational costs associated with modifying one or more of the assistant outputs can include, for example, one or more of battery consumption, processor consumption associated with modifying one or more of the assistant outputs, or latency associated with modifying one or more of the assistant outputs. For example, if the client device is in a low power mode, then the automated assistant may determine not to generate the set of modified assistant outputs to reduce battery consumption of the client device.

By using the techniques described herein, one or more technical advantages can be achieved. As one non-limiting example, the techniques described herein enable the automated assistant to engage in natural conversations with a user during a dialog session. For instance, the automated assistant can generate modified assistant outputs using one or more LLM outputs that are more conversational in nature. Accordingly, the automated assistant can proactively provide contextual information associated with the dialog session that was not directly solicited by the user (e.g., by generating the additional assistant query as described herein and by providing the additional assistant output determined based on the additional assistant query), thereby causing the modified assistant output to be resonate with the user. Further, the modified assistant outputs can be generated with various personalities in terms of both a vocabulary that is contextually adapted throughout the dialog session and in terms of prosodic properties utilized to audibly render the modified assistant output, thereby causing the modified assistant output to even further resonate with the user. This results in various technical advantages that conserve computational resources at a client device, and can cause dialog sessions to be concluded in a quicker and more efficient manner and/or a quantity of dialog sessions to be reduced. For instance, a quantity of user inputs received at the client device can be reduced since a quantity of occurrences of the user having to request information that is contextually relevant to a dialog session can be reduced since it may be proactively provided for presentation to the user by the automated assistant. Also, for instance, in implementations where the one or more LLM outputs are generated in an offline manner and subsequently utilized in an online manner, latency can be reduced at run-time.

As used herein, a "dialog session" may include a logically-self-contained exchange between a user and automated assistant (and in some cases, other human participants). The automated assistant may differentiate between multiple dialog sessions with the user based on various signals, such as passage of time between sessions, change of user context (e.g., location, before/during/after a scheduled meeting, etc.) between sessions, detection of one or more intervening interactions between the user and the client device other than dialog between the user and the automated assistant (e.g., the user switches applications for a while, the user walks away from then later returns to a standalone voice-activated product), locking/sleeping of the client device between sessions, change of client devices used to interface with the automated assistant, and so forth. Notably, during a given dialog session, a user can interact with the automated assistant using various input modalities, including, but not limited to, spoken input, typed input, and/or touch input.

The above description is provided as an overview of only some implementations disclosed herein. Those implementations, and other implementations, are described in additional detail herein.

It should be understood that techniques disclosed herein can be implemented locally on a client device, remotely by server(s) connected to the client device via one or more networks, and/or both.

DETAILED DESCRIPTION

Figure 1:
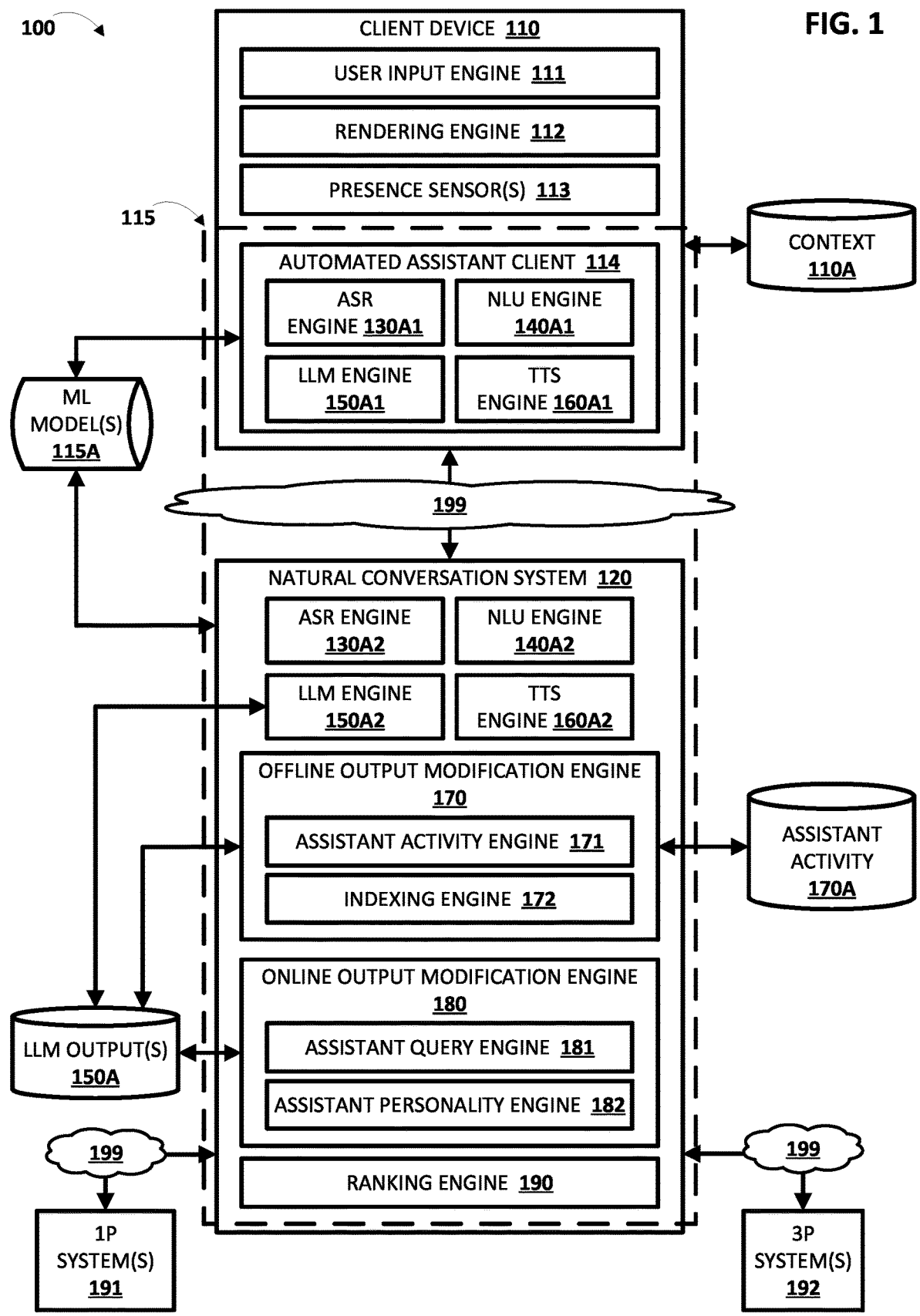
FIG. 1 depicts a block diagram of an example environment that demonstrates various aspects of the present disclosure, and in which implementations disclosed herein can be implemented.

Turning now to FIG. 1, a block diagram of an example environment 100 that demonstrates various aspects of the present disclosure, and in which implementations disclosed herein can be implemented is depicted. The example environment 100 includes a client device 110 and a natural conversation system 120. In some implementations, the natural conversation system 120 can be implemented locally at the client device 110. In additional or alternative implementations, the natural conversation system 120 can be implemented remotely from the client device 110 as depicted in FIG. 1 (e.g., at remote server(s)). In these implementations, the client device 110 and the natural conversation system 120 may be communicatively coupled with each other via one or more networks 199, such as one or more wired or wireless local area networks ("LANs," including Wi-Fi LANs, mesh networks, Bluetooth, near-field communication, etc.) or wide area networks ("WANs", including the Internet).

The client device 110 may be, for example, one or more of: a desktop computer, a laptop computer, a tablet, a mobile phone, a computing device of a vehicle (e.g., an in-vehicle communications system, an in-vehicle entertainment system, an in-vehicle navigation system), a standalone interactive speaker (optionally having a display), a smart appliance such as a smart television, and/or a wearable apparatus of the user that includes a computing device (e.g., a watch of the user having a computing device, glasses of the user having a computing device, a virtual or augmented reality computing device). Additional and/or alternative client devices may be provided.

The client device 110 can execute an automated assistant client 114. An instance of the automated assistant client 114 can be an application that is separate from an operating system of the client device 110 (e.g., installed "on top" of the operating system)—or can alternatively be implemented directly by the operating system of the client device 110. The automated assistant client 114 can interact with the natural conversation system 120 implemented locally at the client device 110 or remotely and invoked via one or more of the networks 199 as depicted in FIG. 1. The automated assistant client 114 (and optionally by way of its interactions with other remote system (e.g., server(s))) may form what appears to be, from a user's perspective, a logical instance of an automated assistant 115 with which the user may engage in a human-to-computer dialog. An instance of the automated assistant 115 is depicted in FIG. 1, and is encompassed by a dashed line that includes the automated assistant client 114 of the client device 110 and the natural conversation system 120. It thus should be understood that a user that engages with the automated assistant client 114 executing on the client device 110 may, in effect, engage with his or her own logical instance of the automated assistant 115 (or a logical instance of the automated assistant 115 that is shared amongst a household or other group of users). For the sake of brevity and simplicity, the automated assistant 115 as used herein will refer to the automated assistant client 114 executing locally on the client device 110 and/or executing remotely at one or more remote servers that may implement the natural conversation system 120.

In various implementations, the client device 110 may include a user input engine 111 that is configured to detect user input provided by a user of the client device 110 using one or more user interface input devices. For example, the client device 110 may be equipped with one or more microphones that capture audio data, such as audio data corresponding to spoken utterances of the user or other sounds in an environment of the client device 110. Additionally, or alternatively, the client device 110 may be equipped with one or more vision components that are configured to capture vision data corresponding to images and/or movements (e.g., gestures) detected in a field of view of one or more of the vision components. Additionally, or alternatively, the client device 110 may be equipped with one or more touch sensitive components (e.g., a keyboard and mouse, a stylus, a touch screen, a touch panel, one or more hardware buttons, etc.) that are configured to capture signal(s) corresponding to touch input directed to the client device 110.

In various implementations, the client device 110 may include a rendering engine 112 that is configured to provide content for audible and/or visual presentation to a user of the client device 110 using one or more user interface output devices. For example, the client device 110 may be equipped with one or more speakers that enable content to be provided for audible presentation to the user via the client device 110. Additionally, or alternatively, the client device 110 may be equipped with a display or projector that enables content to be provided for visual presentation to the user via the client device 110.

In various implementations, the client device 110 may include one or more presence sensors 113 that are configured to provide, with approval from corresponding user(s), signals indicative of detected presence, particularly human presence. In some of those implementations, the automated assistant 115 can identify the client device 110 (or another computing device associated with a user of the client device 110) to satisfy a spoken utterance based at least in part of presence of the user at the client device 110 (or at another computing device associated with the user of the client device 110). The spoken utterance can be satisfied by rendering responsive content (e.g., via the rendering engine 112) at the client device 110 and/or other computing device(s) associated with the user of the client device 110, by causing the client device 110 and/or other computing device(s) associated with the user of the client device 110 to be controlled, and/or by causing the client device 110 and/or other computing device(s) associated with the user of the client device 110 to perform any other action to satisfy the spoken utterance. As described herein, the automated assistant 115 can leverage data determined based on the presence sensors 113 in determining the client device 110 (or other computing device(s)) based on where a user is near or was recently near, and provide corresponding commands to only the client device 110 (or those other computing device(s)). In some additional or alternative implementations, the automated assistant 115 can leverage data determined based on the presence sensors 113 in determining whether any user(s) (any users or specific users) are currently proximal to the client device 110 (or other computing device(s)), and can optionally suppress provision of data to and/or from the client device 110 (or other computing device(s)) based on the user(s) that are proximal to the client device 110 (or other computing device(s)).

The presence sensors 113 may come in various forms. For example, the client device 110 can utilize one or more of the user interface input components described above with respect to the user input engine 111 to detect presence of the user. Additionally, or alternatively, the client device 110 may be equipped with other types of light-based presence sensors 113, such as passive infrared ("PIR") sensors that measure infrared ("IR") light radiating from objects within their fields of view.

Additionally, or alternatively, in some implementations, the presence sensors 113 may be configured to detect other phenomena associated with human presence or device presence. For example, in some embodiments, the client device 110 may be equipped with a presence sensor 113 that detects various types of wireless signals (e.g., waves such as radio, ultrasonic, electromagnetic, etc.) emitted by, for instance, other computing devices carried/operated by a user (e.g., a mobile device, a wearable computing device, etc.) and/or other computing devices. For example, the client device 110 may be configured to emit waves that are imperceptible to humans, such as ultrasonic waves or infrared waves, that may be detected by other computing device(s) (e.g., via ultrasonic/infrared receivers such as ultrasonic-capable microphones).

Additionally, or alternatively, the client device 110 may emit other types of human-imperceptible waves, such as radio waves (e.g., Wi-Fi, Bluetooth, cellular, etc.) that may be detected by other computing device(s) carried/operated by a user (e.g., a mobile device, a wearable computing device, etc.) and used to determine the user's particular location. In some implementations, GPS and/or Wi-Fi triangulation may be used to detect a person's location, e.g., based on GPS and/or Wi-Fi signals to/from the client device 110. In other implementations, other wireless signal characteristics, such as time-of-flight, signal strength, etc., may be used by the client device 110, alone or collectively, to determine a particular person's location based on signals emitted by the other computing device(s) carried/operated by the user. Additionally, or alternatively, in some implementations, the client device 110 may perform speaker identification (SID) to recognize a user from their voice and/or facial identification (FID) to recognize a user from vision data that captures a face of the user.

In some implementations, movement of the speaker may then be determined, e.g., by the presence sensors 113 of the client device 110 (and optionally GPS sensors, Soli chips, and/or accelerometers of the client device 110). In some implementations, based on such detected movement, a location of the user may be predicted, and this location may be assumed to be the user's location when any content is caused to be rendered at the client device 110 and/or other computing device(s) based at least in part on proximity of the client device 110 and/or other computing device(s) to the user's location. In some implementations, the user may simply be assumed to be in the last location at which he or she engaged with the automated assistant 115, especially if not much time has passed since the last engagement.

Further, the client device 110 and/or the natural conversation system 120 may include one or more memories for storage of data and/or software applications, one or more processors for accessing data and executing the software applications, and/or other components that facilitate communication over one or more of the networks 199. In some implementations, one or more of the software applications can be installed locally at the client device 110, whereas in other implementations one or more of the software applications can be hosted remotely (e.g., by one or more servers) and can be accessible by the client device 110 over one or more of the networks 199.

In some implementations, the operations performed by the automated assistant 115 may be implemented locally at the client device 110 via the automated assistant client 114. As shown in FIG. 1, the automated assistant client 114 may include an automatic speech recognition (ASR) engine 130A1, a natural language understanding (NLU) engine 140A1, a large language model (LLM) engine 150A1, and a text-to-speech (TTS) engine 160A1. In some implementations, the operations performed by the automated assistant 115 may be distributed across multiple computer systems, such as when the natural conversation system 120 is implemented remotely from the client device 110 as depicted in FIG. 1. In these implementations, the automated assistant 115 may additionally or alternatively utilize ASR engine 130A2, NLU engine 140A2, LLM engine 150A2, and TTS engine 160A2 of the natural conversation system 120.

Each of these engines may be configured to perform one or more functions. For example, the ASR engine 130A1 and/or 130A2 can process, using streaming ASR model(s) stored in machine learning (ML) model(s) database 115A (e.g., a recurrent neural network (RNN) model, a transformer model, and/or any other type of ML model capable of performing ASR), a stream of audio data that captures spoken utterances and that is generated by microphone(s) of the client device 110 to generate a stream of ASR output. Notably, the streaming ASR model can be utilized to generate the stream of ASR output as the stream of audio data is generated. Further, the NLU engine 140A1 and/or 140A2 can process, using NLU model(s) stored in the ML model(s) database 115A (e.g., a long short-term memory (LSTM), gated recurrent unit (GRU), and/or any other type of RNN or other ML model capable of performing NLU) and/or grammar-based rule(s), the stream of ASR output to generate a stream of NLU output. Moreover, the automated assistant 115 can cause the NLU output to be processed to generate a stream of fulfillment data. For instance, the automated assistant 115 can transmit one or more structured request to one or more first-party (1P) systems 191 over one or more of the networks 199 (or one or more application programming interfaces (APIs)) and/or one or more third-party (3P) systems 192 over one or more of the networks, and receive fulfillment data from one or more of the 1P systems 191 and/or 3P systems 192 to generate the stream of fulfillment data. The one or more structured requests can include, for example, NLU data included in the stream of fulfillment data. The stream of fulfillment data can correspond to, for example, a set of assistant outputs that are predicted to be responsive to an assistant query included in a spoken utterance captured in the stream of audio data processed by the ASR engine 130A1 and/or 130A2.

Further, the LLM engine 150A1 and/or 150A2 can process the set of assistant outputs that are predicted to be responsive to the assistant query included in the spoken utterance captured in the stream of audio data processed by the ASR engine 130A1 and/or 130A2. As described herein (e.g., with respect to FIGS. 2-6), in some implementations, the LLM engine 150A1 and/or 150A2 can cause the set of assistant outputs to be modified, using one or more LLM outputs, to generate a set of modified assistant outputs. In some versions of those implementations (e.g., and as described with respect to FIG. 3), the automated assistant 115 can cause one or more of the LLM outputs to be generated in an offline manner (e.g., not responsive to a spoken utterance being received during a dialog session), and subsequently utilized in an online manner (e.g., when a spoken utterance is received during a dialog session) to generate the set of modified assistant outputs. In additional or alternative versions of those implementations (e.g., and as described with respect to FIGS. 4 and 5), the automated assistant 115 can cause one or more of the LLM outputs to be generated in an online manner (e.g., when a spoken utterance is received during a dialog session). In these implementations, the one or more LLM outputs can be generated based on processing, using one or more LLMs stored in the model(s) database 115A (e.g., one or more transformer models, such as Meena, RNNs, and/or any other LLM), the set of assistant outputs (e.g., the stream of fulfillment data), a context of dialog session in which the spoken utterance is received (e.g., based on one or more contextual signals stored in context database 110A), recognized text corresponding to the assistant query included in the spoken utterance, and/or other information that the automated assistant 115 can leverage in generating one or more of the LLM outputs. Each of the one or more LLM outputs can include, for example, a probability distribution over a sequence of one or more words and/or phrases across one or more vocabularies, and one or more of the words and/or phrases in the sequence can be selected as the one or more LLM outputs based on the probability distribution. In various implementations, one or more of the LLM outputs can be stored in LLM output(s) database 150A for subsequent utilization in modifying one or more assistant outputs included in the set of assistant outputs.

Moreover, in some implementations, the TTS engine 160A1 and/or 160A2 can process, using TTS model(s) stored in the ML model(s) database 115A, textual data (e.g., text formulated by the automated assistant 115) to generate synthesized speech audio data that includes computer-generated synthesized speech. The textual data can correspond to, for example, one or more assistant outputs from the set of assistant outputs included in the stream of fulfillment data, one or more of the modified assistant outputs from the set of modified assistant outputs, and/or any other textual data described herein. Notably, the ML model(s) stored in the ML model(s) database 115A can be on-device ML models that are stored locally at the client device 110 or shared ML models that are accessible to both the client device 110 and/or remote systems when the natural conversation system 120 is not implemented locally at the client device 110. In additional or alternatively implementations, audio data corresponding to the one or more assistant outputs from the set of assistant outputs included in the stream of fulfillment data, the one or more of the modified assistant outputs from the set of modified assistant outputs, and/or any other textual data described herein can be stored in memory or one or more databases accessible by the client device 110, such that the automated assistant need not use the TTS engine 160A1 and/or 160A2 to generate any synthesized speech audio data in causing audio data to be provided for audible presentation to the user.

In various implementations, the stream of ASR output can include, for example, a stream of ASR hypotheses (e.g., term hypotheses and/or transcription hypotheses) that are predicted to correspond to spoken utterance(s) of a user that are captured in the stream of audio data, one or more corresponding predicted values (e.g., probabilities, log likelihoods, and/or other values) for each of the ASR hypotheses, a plurality of phonemes that are predicted to correspond to spoken utterance(s) of a user that are captured in the stream of audio data, and/or other ASR output. In some versions of those implementations, the ASR engine 130A1 and/or 130A2 can select one or more of the ASR hypotheses as recognized text that corresponds to the spoken utterance (e.g., based on the corresponding predicted values).

In various implementations, the stream of NLU output can include, for example, a stream of annotated recognized text that includes one or more annotations of the recognized text for one or more (e.g., all) of the terms of the recognized text. For example, the NLU engine 140A1 and/or 140A2 may include a part of speech tagger (not depicted) configured to annotate terms with their grammatical roles. Additionally, or alternatively, the NLU engine 140A1 and/or 140A2 may include an entity tagger (not depicted) configured to annotate entity references in one or more segments of the recognized text, such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the NLU engine 140A1 and/or 140A2 may include a coreference resolver (not depicted) configured to group, or "cluster," references to the same entity based on one or more contextual cues. For example, the coreference resolver may be utilized to resolve the term "them" to "buy theatre tickets" in the natural language input "buy them", based on "theatre tickets" being mentioned in a client device notification rendered immediately prior to receiving input "buy them". In some implementations, one or more components of the NLU engine 140A1 and/or 140A2 may rely on annotations from one or more other components of the NLU engine 140A1 and/or 140A2. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

Although FIG. 1 is described with respect to a single client device having a single user, it should be understood that is for the sake of example and is not meant to be limiting. For example, one or more additional client devices of a user can also implement the techniques described herein. For instance, the client device 110, the one or more additional client devices, and/or any other computing devices of the user can form an ecosystem of devices that can employ techniques described herein. These additional client devices and/or computing devices may be in communication with the client device 110 (e.g., over the network(s) 199). As another example, a given client device can be utilized by multiple users in a shared setting (e.g., a group of users, a household).

As described herein, the automated assistant 115 can determine whether to modify the set of assistant responses using one or more of the LLM outputs and/or determine one or more sets of modified assistant outputs based on one or more of the LLM outputs. The automated assistant 115 can make these determinations utilizing the natural conversation system 120. In various implementations, and as depicted in FIG. 1, the natural conversation system 120 can additionally, or alternatively, include offline output modification engine 170, an online output modification engine 180, and/or a ranking engine 190. The offline output modification engine 170 can include, for example, an assistant activity engine 171 and an indexing engine 172. Further, the online output modification engine 180 can include, for example, an assistant query engine 181 and an assistant personality engine 182. These various engines of the natural conversation system 120 are described in more detail with respect to FIGS. 2-5.

Figure 2:
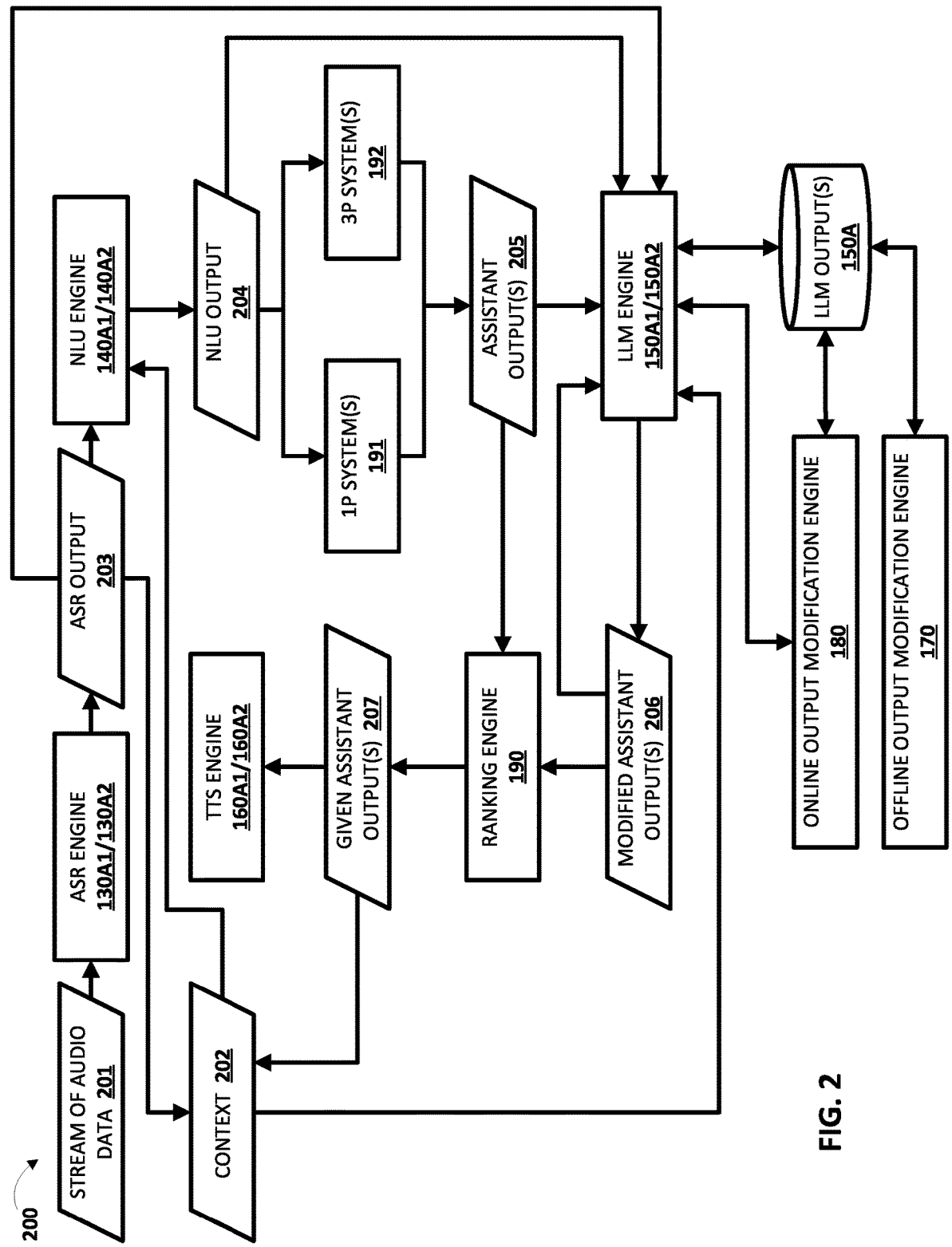
FIG. 2 depicts an example process flow of utilizing large language models in generating assistant output(s), in accordance with various implementations.

Turning now to FIG. 2, an example process flow 200 of utilizing LLMs in generating assistant output(s) is depicted. A stream of audio data 201 generated by one or more microphones of the client device 110 of FIG. 1 can be processed by the ASR engine 130A1 and/or 130A2 to generate a stream of ASR output 203. Further, the ASR output 203 can be processed by the NLU engine 140A1 and/or 140A2 to generate a stream of NLU output 204. In some implementations, the NLU engine 140A1 and/or 140A2 may process a context 202 of the dialog session between a user of the client device 110 and the automated assistant 115 executing at least in part at the client device 110 of the user. In some versions of those implementations, the context 202 of the dialog session can be determined based on one or more contextual signals generated by the client device 110 (e.g., a time of day, a day of week, a location of the client device 110, ambient noise detected in an environment of the client device 110, and/or other contextual signals generated by the client device 110). In additional or alternative versions of those implementations, the context 202 of the dialog session can be determined based on one or more contextual signals stored in a context database 110A accessible at the client device 110 (e.g., user profile data, software application data, environmental data about a known environment of the user of the client device 110, dialog history of the ongoing dialog session between the user and the automated assistant 115 and/or historical dialog history of one or more prior dialog sessions between the user and the automated assistant 115, and/or other contextual data stored in the context database 110A). Moreover, the stream of NLU output 204 can be processed by one or more of the 1P systems 191 and/or the 3P systems to generate a stream of fulfillment data that includes a set of one or more assistant outputs 205, where each of the one or more assistant outputs included in the set of one or more assistant outputs 205 is predicted to be responsive to a spoken utterance captured in the stream of audio data 201.

Typically, in turn-based dialog sessions that do not utilize LLMs, the ranking engine 190 may process the set of one or more assistant outputs 205 to rank each of the one or more assistant outputs included in the set of one or more assistant outputs 205 according to one or more ranking criteria, and that automated assistant 115 may select one or more given assistant outputs 207, from the set of one or more assistant outputs 205, to be provided for presentation to the user of the client device 110 in response to receiving the spoken utterance. In some implementations, the selected one or more given assistant outputs 207 can be processed by the TTS engine 160A1 and/or 160A2 to generate synthesized speech audio data that includes synthesized speech corresponding to the selected one or more given assistant outputs 207, and the rendering engine 112 can cause the synthesized speech audio data to be audibly rendered by speaker(s) of the client device 110 for audible presentation to the user of the client device 110. In additional or alternative implementations, the rendering engine 112 can cause textual data corresponding to the selected one or more given assistant outputs 207 to be visually rendered by a display of the client device 110 for visual presentation to the user of the client device 110.

However, in using claimed techniques, the automated assistant 115 can further cause the set of one or more assistant outputs 205 to be processed by the LLM engine 150A1 and/or 150A2 to generate a set of one or more modified assistant outputs 206. In some implementations, one or more LLM outputs can be previously generated in an offline manner (e.g., prior to receiving the stream of audio data 201 that is generated by one or more of the microphones of the client device 110) using the offline output modification engine 170, and the one or more LLM outputs can be stored in the LLM output(s) database 150A. As described with respect to FIG. 3, the one or more LLM outputs can be previously indexed in the LLM output(s) database 150A based on a corresponding assistant query and/or a corresponding context of a corresponding dialog session in which the corresponding assistant query was received. Further, the LLM engine 150A1 and/or 150A2 can determine that the assistant query included in the spoken utterance that is captured in the stream of audio data 201 matches the corresponding assistant query and/or the context 202 of the dialog session in which the assistant query is received matches the corresponding context of the corresponding dialog session in which the corresponding assistant query was received. The LLM engine 150A1 and/or 150A2 can obtain the one or more LLM outputs indexed by the corresponding assistant query and/or the corresponding context that matches the assistant query to modify the set of one or more assistant outputs 205. Moreover, the set of one or more assistant outputs 205 can be modified based on one or more of the LLM outputs, thereby resulting in the set of one or more modified assistant outputs 206.

In additional or alternative implementations, one or more LLM outputs can be generated in an online manner (e.g., in response to receiving the stream of audio data 201 that is generated by one or more of the microphones of the client device 110) using the online output modification engine 180. As described with respect to FIGS. 4 and 5, the one or more LLM outputs can be generated based on processing, using one or more LLMs stored in the ML model(s) database 115A, the set of one or more assistant outputs 205, recognized text that corresponds to the assistant query included in the spoken utterance that is captured in the stream of audio data 201 (e.g., included in the stream of ASR output 203), and/or the context 202 of the dialog session between the user of the client device 110 and the automated assistant 115 to generate the one or more LLM outputs. Further, the set of one or more assistant outputs 205 can be modified based on one or more of the LLM outputs, thereby resulting in the set of one or more modified assistant outputs 206. Put another way, in these implementations, the LLM engine 150A1 and/or 150A2 can directly generate the set of one or more modified assistant outputs 206 using one or more of the LLMs stored in the ML model(s) database 115A.

In these implementations, and in contrast the typical turn-based dialog sessions described above that do not utilize LLMs, the ranking engine 190 may process the set of one or more assistant outputs 205 and the set of one or more modified assistant outputs 206 to rank each of the one or more assistant outputs included in both the set of one or more assistant outputs 205 and the set of one or more modified assistant outputs 206 according to one or more ranking criteria. Accordingly, in selecting the one or more given assistant outputs 207, the automated assistant 207 can select from among the set of one or more assistant outputs 205 and the set of one or more modified assistant outputs 206. Notably, the assistant outputs included in the set of one or more modified assistant outputs 206 may be generated based on the set of one or more assistant outputs 205 and convey the same or similar information, but also convey the same or similar information along with additional information that is relevant to the context 202 of the dialog (e.g., as described with respect to FIG. 4) and/or that is more natural, fluid, and/or more in character with the automated assistant, such that the one or more given assistant outputs 207 better resonate with the user of the client device 110.

The one or more ranking criteria can include, for example, one or more predicted measures (e.g., ASR measures generated by the ASR engine 130A1 and/or 130A2 in generating the stream of ASR output 203, NLU measures generated by the NLU engine 140A1 and/or 140A2 in generating the stream of NLU output 204, fulfillment measures generated by one or more of the 1P systems 191 and/or the 3P systems 192) that are indicative of how responsive each of the assistant outputs included in the set of one or more assistant outputs 205 and the set of one or more modified assistant outputs 206 are predicted to be to the assistant query included in the spoken utterance captured in the stream of audio data 201, one or more intents included in the stream of NLU output 204, measures derived from a classifier that processes each of the assistant outputs included in the set of one or more assistant outputs 205 and the set of one or more modified assistant outputs 206 to determine how natural, fluid, and/or in character with the automated assistant that each of the assistant outputs would be when provided for presentation to the user, and/or other ranking criteria. For example, if an intent of the user of the client device 110 indicates the user would like a factual answer (e.g., based on providing a spoken utterance that includes an assistant query of "why is the sky blue?"), then the ranking engine 190 can promote one or more of the assistant outputs included in the set of one or more assistant outputs 205 since it is likely that the user would like a straightforward answer to the assistant query. However, if an intent of the user of the client device 110 indicates the user provided more open-ended input (e.g., based on providing a spoken utterance that includes an assistant query of "what time is it?"), then the ranking engine 190 can promote one or more of the assistant outputs included in the set of one or more modified assistant outputs 206 since it is likely that the user would prefer more conversational aspects.

Although FIGS. 1 and 2 are described herein with respect to voice-based dialog sessions, it should be understood that is for the sake of example and is not meant to be limiting. Rather, it should be understood that the techniques described herein can be utilized regardless of an input modality of the user. For example, in some implementations where the user provides typed input and/or touch input as the assistant query, the automated assistant 115 can process the typed input using the NLU engine 140A1 and/or 140A2 to generate the stream of NLU output 204 (e.g., skipping processing of the stream of audio data 201), and the LLM engine 150A1 and/or 150A2 can utilize textual input corresponding to the assistant query (e.g., derived from the typed input and/or touch input) in generating the set of one or more modified assistant outputs 206 in the same or similar manner described above.

Figure 3:
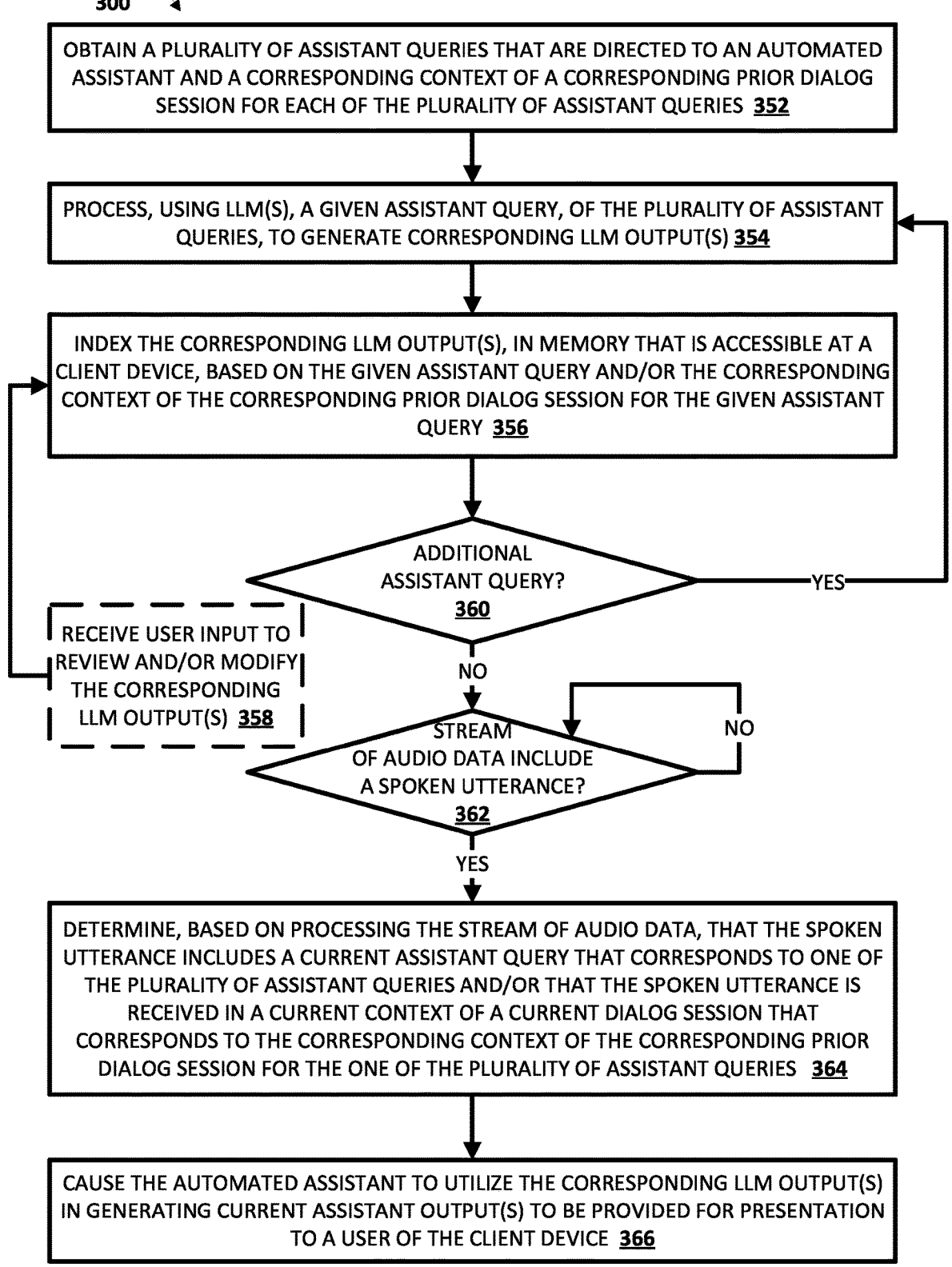
FIG. 3 depicts a flowchart illustrating an example method of utilizing large language models in generating assistant output(s) in an offline manner for subsequent usage in an online manner, in accordance with various implementations.

Turning now to FIG. 3, a flowchart illustrating an example method 300 of utilizing large language models in generating assistant output(s) in an offline manner for subsequent usage in an online manner is depicted. For convenience, the operations of the method 300 are described with reference to a system that performs the operations from the process flow 200 of FIG. 2. This system of the method 300 includes one or more processors, memory, and/or other component(s) of computing device(s) (e.g., client device 110 of FIG. 1, client device 610 of FIG. 6, and/or computing device 710 of FIG. 7, one or more servers, and/or other computing devices). Moreover, while operations of the method 300 are shown in a particular order, this is not meant to be limiting. One or more operations may be reordered, omitted, and/or added.

At block 352, the system obtains a plurality of assistant queries that are directed to an automated assistant and a corresponding context of a corresponding prior dialog session for each of the plurality of assistant queries. For example, the system can cause the assistant activity engine 171 of the offline output modification engine of FIGS. 1 and 2 to obtain the plurality of assistant queries and the corresponding contexts of the prior dialog sessions in which the plurality of assistant queries was received from, for example, assistant activity database 170A depicted in FIG. 1. In some implementations, the plurality of assistant queries and the corresponding contexts of the prior dialog sessions in which the plurality of assistant queries was received can be limited to those associated with a user of a client device (e.g., the user of the client device 110 of FIG. 1). In other implementations, the plurality of assistant queries and the corresponding contexts of the prior dialog sessions in which the plurality of assistant queries was received can be limited to those associated with a plurality of users of respective client devices (e.g., that may or may not include the user of the client device 110 of FIG. 1).

At block 354, the system processes, using one or more LLMs, a given assistant query, of the plurality of assistant queries, to generate one or more corresponding LLM outputs, where each of the one or more corresponding LLM outputs being predicted to be responsive to the given assistant query. Each of the one or more corresponding LLM outputs can include, for example, a probability distribution over a sequence of one or more words and/or phrases across one or more vocabularies, and one or more of the words and/or phrases in the sequence can be selected as the one or more corresponding LLM outputs based on the probability distribution. In various implementations, in generating the one or more corresponding LLM outputs for the given assistant query, the system can process, using one or more of the LLMs and along with the assistant query, the corresponding context of the corresponding prior dialog session in which the given assistant query was received and/or a set of assistant outputs that are predicted to be responsive to the given assistant query (e.g., generated based on processing audio data corresponding to the given assistant query using the ASR engine 130A1 and/or 130A2, the NLU engine 140A1 and/or 140A2, and one or more of the 1P systems 191 and/or 3P systems 192 as described with respect to FIG. 2). In some implementations, the system can process recognized text corresponding to the given assistant query, whereas in additional or alternative implementations, the system can process audio data that captures a spoken utterance including the given assistant query. In some implementations, the system can cause the LLM engine 150A1 to process the given assistant query using one or more of the LLMs locally at a client device of a user (e.g., the user of the client device 110 of FIG. 1), whereas in other implementations, the system can cause the LLM engine 150A2 to process the given assistant query using one or more of the LLMs remotely from a client device of a user (e.g., at remote server(s)). As described herein, the one or more corresponding LLM outputs can reflect more natural conversational output than that of typical assistant output that may be provided by the automated assistant, which enables the automated assistant to drive the dialog session in a more fluid manner, such that assistant output modified based on one or more of the corresponding LLM outputs is more likely to resonate with a user that perceives the modified assistant output.

In some implementations, and in addition to the one or more corresponding LLM outputs, an additional assistant query can be generated using one or more of the LLM models based on processing the given assistant query and/or the corresponding context of the corresponding prior dialog session in which the given assistant query was received. For example, in processing the given assistant query and/or the corresponding context of the corresponding prior dialog session in which the given assistant query was received, one or more of the LLMs can determine an intent associated with the given assistant query (e.g., based on the stream of NLU output 204 generated using the NLU engine 140A1 and/or 140A2 in FIG. 2). Further, the one or more of the LLMs can identify, based on the intent associated with the given assistant query, at least one related intent that is related to the intent associated with the given assistant query (e.g., based on a mapping of the intent to the at least one related intent in a database or memory accessible to the client device 110 and/or based on processing the intent associated with the given assistant query using one or more machine learning (ML) models or heuristically defined rules). Moreover, the one or more of the LLMs can generate the additional assistant query based on the at least one related intent. For example, assume the assistant query indicates that a user has not eaten dinner yet (e.g., the given assistant query of "I'm feeling pretty hungry" received in the evening at a physical dwelling of the user as indicted by the corresponding context of the corresponding prior dialog session that is associated with an intent of the user indicating he/she would like to eat). In this example, the additional assistant query can correspond to, for example, "what types of cuisine has the user indicated he/she prefers?" (e.g., reflecting a related cuisine type intent associated with the intent of the user indicating he/she would like to eat), "what restaurants nearby are open?" (e.g., reflecting a related restaurant lookup intent associated with the intent of the user indicating he/she would like to eat), and/or other additional assistant queries.

In these implementations, additional assistant output can be determined based on processing the additional assistant query. In the above example where the additional assistant query is "what types of cuisine has the user indicated he/she prefers?", user profile data from one or more of the 1P systems 191 that is stored locally at the client device 110 can be utilized to determine the user has indicated he/she prefers Mediterranean cuisine and Indian cuisine. Based on the user profile data indicating that the user prefers Mediterranean cuisine and Indian cuisine, the one or more corresponding LLM outputs can be modified to ask the user whether Mediterranean cuisine and/or Indian cuisine sounds appetizing to the user (e.g., "how does Mediterranean cuisine or Indian cuisine sound for dinner").

In the above example where the additional assistant query is "what restaurants nearby are open?", restaurant data from one or more of the 1P systems 191 and/or 3P systems 192 can be utilized to determine what restaurants near the primary dwelling of the user are open (and optionally limited to restaurants that serve Mediterranean cuisine and Indian cuisine based on the user profile data). Based on the results, the one or more corresponding LLM outputs can be modified to provide the user with a list of one or more restaurants that are open near the primary dwelling of the user (e.g., "Example Mediterranean Restaurant is open until 9:00 PM and Example Indian Restaurant is open until 10:00 PM"). Notably, the additional assistant query that is initially generated using the LLMs (e.g., "what types of cuisine has the user indicated he/she prefers?" and "what types of cuisine has the user indicated he/she prefers?" in the above examples) may not be included in the one or more corresponding LLM outputs, and, as a result, may not be provided for presentation to the user. Rather, additional assistant output determined based on the additional assistant query (e.g., "how does Mediterranean cuisine or Indian cuisine sound for dinner" and "Example Mediterranean Restaurant is open until 9:00 PM and Example Indian Restaurant is open until 10:00 PM") may be included in the one or more corresponding LLM outputs, and, as a result, may be provided for presentation to the user.

In additional or alternative implementations, each of the one or more corresponding LLM outputs (and optionally the additional assistant output(s) determined based on the additional assistant query) can be generated using a corresponding set of parameters, of a plurality of disparate sets of parameters, of one or more of the LLMs. Each of the plurality of disparate sets of parameters can be associated with disparate personalities for the automated assistant. In some versions of those implementations, a single LLM can be utilized to generate the one or more corresponding LLM outputs using the corresponding sets of parameters for each of the disparate personalities, whereas in other versions of those implementations, multiple LLMs can be utilized to generate the one or more corresponding LLM outputs using the corresponding sets of parameters for each of the disparate personalities. For example, a single LLM can be utilized to generate first LLM output using a first set of parameters that reflect a first personality (e.g., a chef personality in the above example where the given assistant query corresponds to "I'm feeling pretty hungry"); generate second LLM output using a second set of parameters that reflect a second personality (e.g., a butler personality in the above example where the given assistant query corresponds to "I'm feeling pretty hungry"); and so on for a plurality of other disparate personalities. Also, for example, a first LLM can be utilized to generate first LLM output using a first set of parameters that reflect a first personality (e.g., a chef personality in the above example where the given assistant query corresponds to "I'm feeling pretty hungry"); a second LLM can be utilized to generate second LLM output using a second set of parameters that reflect a second personality (e.g., a butler personality in the above example where the given assistant query corresponds to "I'm feeling pretty hungry"); and so on for a plurality of other disparate personalities. Accordingly, when the corresponding LLM output is provided for presentation to the user, it can reflect various dynamic contextual personalities via prosodic properties of different personalities (e.g., intonation, cadence, pitch, pause, tempo, stress, rhythm, etc. of these different personalities). Additionally, or alternatively, the user can define one or more personalities to be utilized by the automated assistant (e.g., via settings of an automated assistant application associated with the automated assistant described herein) in a persistent manner (e.g., always use a butler personality) and/or in a contextual manner (e.g., use a butler personality in the morning and evening, but a different personality in the afternoon).

Notably, these personality replies described herein not only reflect the prosodic properties of the different personalities, but can also reflect a vocabulary of the different personalities and/or disparate speaking styles of the different personalities (e.g., a verbose speaking style, a terse speaking style, a kind personality, a sarcastic personality, etc.). For example, the chef personality described above may have a specific chef vocabulary, such that the probability distribution over a sequence of one or more words and/or phrases for the one or more corresponding LLM outputs generated using the set of parameters for the chef personality can promote sequences of words and/or phrases used by chefs over other sequences of words and/or phrases for other personalities (e.g., a scientist personality, a librarian personality, etc.). Accordingly, when one or more of the corresponding LLM outputs are provided for presentation to the user, it can reflect various dynamic contextual personalities not only in terms of the prosodic properties of the different personalities, but also an accurate and realistic vocabulary of the different personalities, such that the one or more corresponding LLM outputs better resonate with the user in different contextual scenarios. Moreover, it should be understood that the vocabulary and/or the speaking style of the different personalities can be defined with varying degrees of granularity. Continuing with the above example, the chef personality described above may have a specific Mediterranean chef vocabulary when asking about Mediterranean cuisine based on the additional assistant query being associated with Mediterranean cuisine, a specific Indian chef vocabulary when asking about Indian cuisine based on the additional assistant query being associated with Indian cuisine, and so on.

At block 356, the system indexes one or more of the corresponding LLM output, in memory that is accessible at a client device (e.g., the LLM output(s) database 150A of FIG. 1), based on the given assistant query and/or the corresponding context of the corresponding prior dialog session for the given assistant query. For example, the system can cause the indexing engine 172 of the offline output modification engine of FIGS. 1 and 2 to index the one or more corresponding LLM outputs in the LLM output(s) database 150A. In some implementations, the indexing engine 172 can index the one or more corresponding LLM outputs based on one or more terms included in the given assistant query and/or one or more contextual signals included in the corresponding context of the corresponding prior dialog session in which the given assistant query was received. In additional or alternative implementations, the indexing engine 172 can cause an embedding of the given assistant query (e.g., a word2vec embedding or any other lower-dimensional representation) to be generated and/or an embedding of the one or more contextual signals included in the corresponding context of the corresponding prior dialog session in which the given assistant query was received to be generated, and one or more of these embeddings can be mapped to an embedding space (e.g., a lower-dimensional space). In these implementations, the one or more corresponding LLM outputs that are indexed in the LLM output (s) database 150A can be subsequently utilized by the online output modification engine 180 to modify a set of assistant outputs (e.g., as described below with respect to blocks 362, 364, and 366 of the method 300 of FIG. 3). In various implementations, the system can additionally or alternatively generate one or more assistant outputs (e.g., the one or more assistant outputs 205 as described with respect to FIG. 2) that are predicted to be responsive to the given assistant query (but not generated using the LLM engine 150A1 and/or 150A2), and the one or more corresponding LLM outputs can additionally or alternatively be indexed by the one or more assistant outputs.

In some implementations, and as indicated at block 358, the system may optionally receive user input to review and/or modify one or more of the corresponding LLM outputs. For example, a human reviewer can analyze the one or more corresponding LLM outputs generated using the one or more LLM models and modify one or more of the corresponding LLM outputs by changing one or more of the terms and/or phrases included in the one or more corresponding LLM outputs. Also, for example, the human reviewer can re-index, discard, and/or otherwise modify the index of the one or more corresponding LLM outputs. Accordingly, in these implementations, the one or more corresponding LLM outputs generated using the one or more LLMs can be curated by the human reviewer to ensure quality of the one or more corresponding LLM outputs. Moreover, any non-discarded, re-indexed and/or curated LLM outputs can be utilized to modify or re-train the LLM in an offline manner.

At block 360, the system determines whether there is an additional assistant query included in the plurality of assistant queries obtained at block 352 that has not been processed using one or more of the LLMs. If, at an iteration of block 360, the system determines that there is an additional assistant query included in the plurality of assistant queries obtained at block 352 that has not been processed using one or more of the LLMs, then the system returns to block 354 and performs and additional iteration of blocks 354 and 356, but with respect to the additional assistant rather than the given assistant query. These operations can be repeated for each of the assistant queries included in the plurality of assistant queries obtained at block 352. Put another way, the system can index one or more corresponding LLM outputs for each of the assistant queries and/or the corresponding contexts of the corresponding prior dialog sessions in which a corresponding one of the plurality of assistant queries is received prior to causing the one or more corresponding LLM outputs to be utilized.

If, at an iteration of block 360, the system determines that there is no additional assistant query included in the plurality of assistant queries obtained at block 352 that have not been processed using one or more of the LLMs, the system may proceed to block 362. At block 362, the system can monitor a stream of audio data generated by one or more microphones of the client device to determine whether the stream of audio data captures a spoken utterance of a user of the client device that is directed to the automated assistant. For example, the system may monitor for one or more particular words or phrases included in the stream of audio data (e.g., monitor for one or more particular words or phrases that invoke the automated assistant using a hotword detection model). Also, for example, the system may monitor for speech that is directed to the client device and optionally in addition to one or more other signals (e.g., one or more gestures captured by vision sensors of the client device, eye gaze directed to the client device, etc.). If, at an iteration of block 362, the system determines that the stream of audio data does not capture a spoken utterance of a user of the client device that is directed to the automated assistant, then the system may continue monitoring the stream of audio data at block 362. If, at an iteration of block 362, the system determines that the stream of audio data captures a spoken utterance of a user of the client device that is directed to the automated assistant, then the system may proceed to block 364.

At block 364, the system determines, based on processing the stream of audio data, that the spoken utterance includes a current assistant query that corresponds to one of the plurality of assistant queries and/or that the spoken utterance is received in a current context of a current dialog session that corresponds to the corresponding context of the corresponding prior dialog session for the one of the plurality of assistant queries. For example, the system can process the stream of audio data (e.g., the stream of audio data 201 of FIG. 2) using the ASR engine 130A1 and/or 130A2 to generate a stream of ASR output (e.g., the stream of ASR output 203 of FIG. 2). Further, the system can process the stream of ASR output using the NLU engine 140A1 and/or 140A2 to generate a stream of NLU output (e.g., the stream of NLU output 204 of FIG. 2). Moreover, based on the stream of ASR output and/or the stream of NLU output, the system can identify the current assistant query. In some implementations, the system can further determine a set of one or more assistant outputs (e.g., the one or more assistant outputs 205 of FIG. 2) by causing one or more of the 1P systems 191 and/or the 3P systems to process the stream of ASR output and/or the stream of NLU output.

In some implementations of the method 300 of FIG. 3, the system can utilize the online output modification engine 180 to determine that one or more terms or phrases of the current assistant query correspond to one or more terms or phrases of one of the plurality of assistant queries for which one or more of the corresponding LLM outputs were indexed (e.g., using any known technique to determine whether terms or phrases correspond to one or another, such as an exact matching technique, a soft matching technique, an edit distance technique, a phonetic similarity technique, an embedding technique, etc.). In response to determining that one or more terms or phrases of the current assistant query correspond to one or more terms or phrases of one of the plurality of assistant queries, the system can obtain (e.g., from the LLM output(s) database 150A) one or more of the corresponding LLM outputs indexed at an iteration of block 356 and that are associated with the one of the plurality of assistant queries. For example, if the current query includes the phrase "I'm hungry", then the system can obtain one or more of the corresponding LLM outputs generated in the above example described with respect to the given assistant query. For instance, the system can determine that both the current query and the given assistant query described above both include the phrase "I'm hungry" based on comparing an edit distance between terms of the current query and terms of the given assistant query. Also, for instance, the system can generate an embedding of the current assistant query and map the embedding of the current query to the embedding space described above with respect to block 356. Further, the system can determine, based on a distance, in the embedding space, between the generated embedding of the current query and the previously generated embedding for the given assistant query satisfying a distance threshold, that the current assistant query corresponds to the given assistant query.

In additional or alternative implementations of the method 300 of FIG. 3, the system can utilize the online output modification engine 180 to determine that one or more contextual signals detected when the current assistant query is received correspond to one or more corresponding contextual signals when one of the plurality of assistant queries was received (e.g., received the same day of the week, the same time of day, the same location, the same ambient noises are present in an environment of the client device, received in a particular sequence of spoken utterances during the dialog session, etc.). In response to determining that one or more of the contextual signals associated with the current assistant query correspond to one or more contextual signals of one of the plurality of assistant queries, the system can obtain (e.g., from the LLM output(s) database 150A) one or more of the corresponding LLM outputs indexed at an iteration of block 356 and that are associated with the one of the plurality of assistant queries. For example, if the current query was received in the evening at the primary dwelling of the user, then the system can obtain one or more of the corresponding LLM outputs generated in the above example described with respect to the given assistant query. For instance, the system can determine that both the current query and the given assistant query described are associated with a temporal contextual signal of "evening" and a location contextual signal of "primary dwelling". Also, for instance, the system can generate an embedding of the one or more contextual signals associated with the current assistant query and map the embedding of the one or more contextual signals associated with the current query to the embedding space described above with respect to block 356. Further, the system can determine, based on a distance, in the embedding space, between the generated embedding of the one or more contextual signals associated with the current query and the previously generated embedding for the one or more contextual signals associated with the given assistant query satisfying a distance threshold, that the one or more contextual signals associated with the current assistant query corresponds to the one or more contextual signals associated with the given assistant query.

Notably, the system can leverage one, or both, of the current assistant query and the context of the dialog session (e.g., the one or more contextual signals detected) in which the current assistant query is received in determining the one or more corresponding LLM outputs to be utilized in generating one or more current assistant outputs that are to be provided for presentation to the user responsive to the current assistant query. In various implementations, the system can additionally or alternatively utilize the one or more of the assistant outputs generated for the current assistant query in determining the one or more corresponding LLM outputs to be utilized in generating one or more current assistant outputs that are to be provided for presentation to the user responsive to the current assistant query. For example, the system can additionally or alternatively generate one or more assistant outputs (e.g., the one or more assistant outputs 205 as described with respect to FIG. 2) that are predicted to be responsive to the current assistant query (but not generated using the LLM engine 150A1 and/or 150A2), and determine that one or more of the assistant outputs) that are predicted to be responsive to the current assistant query correspond to one or more previously generated assistant outputs for the one of the plurality of assistant queries using various techniques described above.

At block 366, the system causes the automated assistant to utilize one or more of the corresponding LLM outputs in generating one or more current assistant outputs to be provided for presentation to a user of the client device. For example, the system can rank, according to one or more ranking criteria, the one or more assistant outputs (e.g., the one or more assistant outputs 205 as described with respect to FIG. 2), and the one or more corresponding LLM outputs (e.g., the one or more modified assistant outputs 206 as described with respect to FIG. 2). Further, the system can select the one or more current assistant outputs from among the one or more assistant outputs and the one or more corresponding LLM outputs. Moreover, the system can cause the one or more current assistant outputs to be visually and/or audibly rendered for presentation to the user of the client device.

Although implementations of the method 300 of FIG. 3 are described with generating the one or more corresponding LLM outputs in an offline manner (e.g., by utilizing the offline output modification engine 170 to generate the corresponding LLM outputs using one or more of the LLMs, and indexing the one or more corresponding LLM outputs in the LLM output(s) database 150A) and subsequently utilizing the one or more corresponding LLM outputs in an online manner (e.g., by utilizing the online output modification engine 180 to determine to utilize from the LLM output(s) database 150A based on the current assistant query), it should be understood that is for the sake of example and is not meant to be limiting. For example, as described below with respect to FIGS. 4 and 5, the online output modification engine 180 can additionally or alternatively utilize the LLM engine 150A1 and/or 150A2 in an online manner in preferred implementations.

Figure 4:
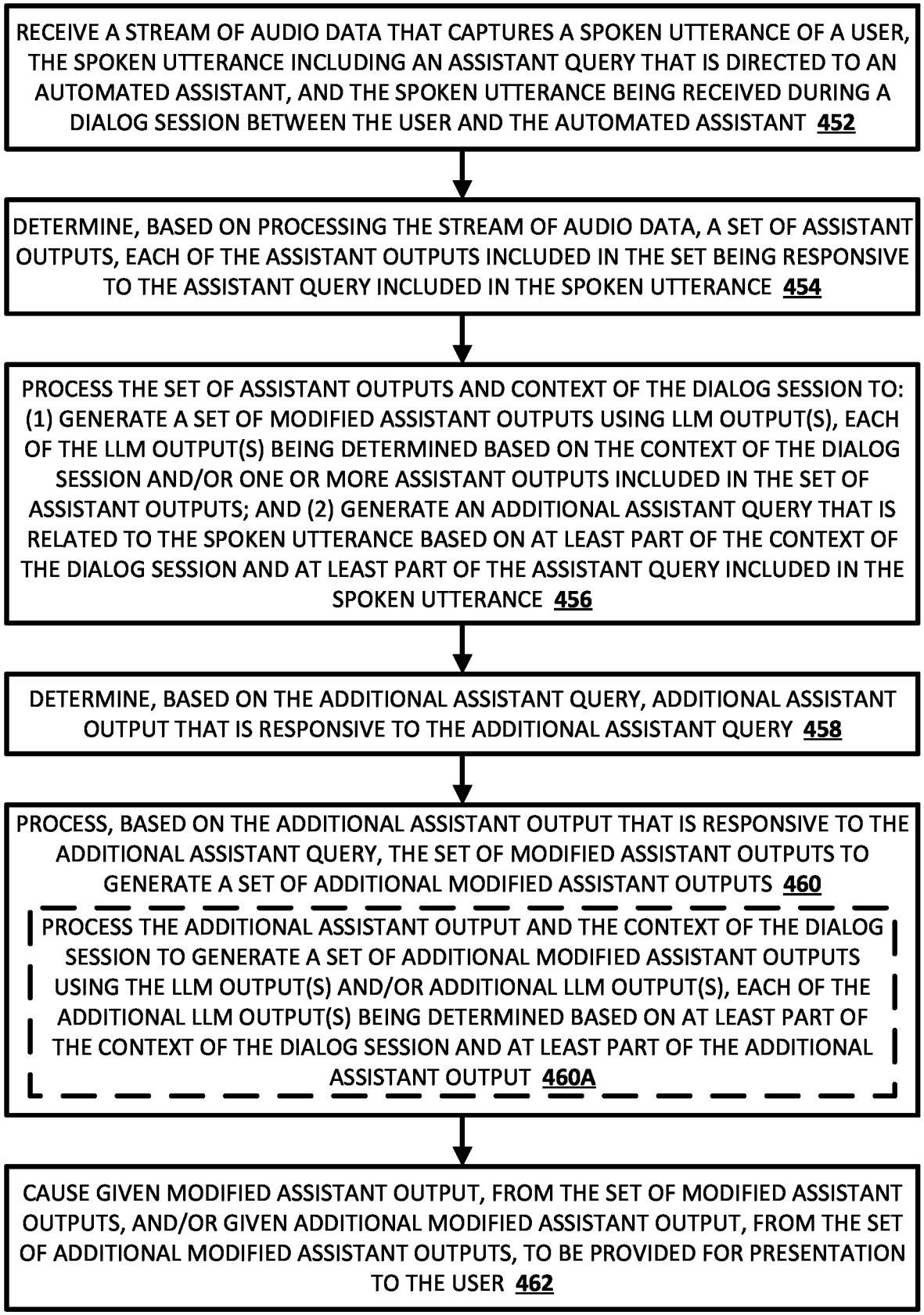
FIG. 4 depicts a flowchart illustrating an example method of utilizing large language models in generating assistant output(s) based on generating an assistant query, in accordance with various implementations.

Turning now to FIG. 4, a flowchart illustrating an example method 400 of utilizing large language models in generating assistant output(s) based on generating an assistant query is depicted. For convenience, the operations of the method 400 are described with reference to a system that performs the operations from the process flow 200 of FIG. 2. This system of the method 400 includes one or more processors, memory, and/or other component(s) of computing device(s) (e.g., client device 110 of FIG. 1, client device 610 of FIG. 6, and/or computing device 710 of FIG. 7, one or more servers, and/or other computing devices). Moreover, while operations of the method 400 are shown in a particular order, this is not meant to be limiting. One or more operations may be reordered, omitted, and/or added.

At block 452, the system receives a stream of audio data that captures a spoken utterance of a user, the spoken utterance including an assistant query that is directed to an automated assistant, and the spoken utterance being received during a dialog session between the user and the automated assistant. In some implementations, the system may only process the stream of audio data to determine that it captures the assistant query in response to determining one or more conditions are satisfied. For example, the system may monitor for one or more particular words or phrases included in the stream of audio data (e.g., monitor for one or more particular words or phrases that invoke the automated assistant using a hotword detection model). Also, for example, the system may monitor for speech that is directed to the client device and optionally in addition to one or more other signals (e.g., one or more gestures captured by vision sensors of the client device, eye gaze directed to the client device, etc.).

At block 454, the system determines, based on processing the stream of audio data, a set of assistant outputs, each of the assistant outputs included in the set being responsive to the assistant query included in the spoken utterance. For example, the system can process the stream of audio data (e.g., the stream of audio data 201) using the ASR engine 130A1 and/or 130A2 to generate a stream of ASR output (e.g., the ASR output 203). Further, the system can process the stream of ASR output (e.g., the stream of audio data 201) using the NLU engine 140A1 and/or 140A2 to generate a stream of NLU output (e.g., the stream of NLU output 204). Moreover, the system can cause one or more 1P systems 191 and/or 3P systems 192 to process the stream of NLU output (e.g., the stream of NLU output 204) to generate the set of assistant outputs (e.g., the set of assistant outputs) 205. Notably, the set of assistant outputs may correspond to one or more candidate assistant outputs that an automated assistant may consider for utilization in responding to the spoken utterances absent the techniques described herein (i.e., techniques that do not utilize the LLM engine 150A1 and/or 150A2 in modifying the assistant outputs as described herein).

At block 456, the system processes the set of assistant outputs and context of the dialog session to: (1) generate a set of modified assistant outputs using one or more LLM outputs, each of the one or more LLM outputs being determined based on at least the context of the dialog session and/or one or more assistant outputs included in the set of assistant outputs; and (2) generate an additional assistant query that is related to the spoken utterance based on at least part of the context of the dialog session and at least part of the assistant query included in the spoken utterance. In various implementations, each of the LLM outputs can be determined further based on the assistant query included in the spoken utterance that is captured in the stream of audio data. In some implementations, in generating the set of modified assistant outputs, the one or more LLM outputs may have been previously generated in an offline manner (e.g., prior to receiving the spoken utterance and using the offline output modification engine 170 as described above with respect to FIG. 3). In these implementations, the system can determine that the assistant query included in the spoken utterance that is captured in the stream of audio data corresponds to a prior assistant query for which the one or more LLM outputs have been previously generated, that the context of the dialog session corresponds to a prior context of a prior dialog session in which the prior assistant query was received, and/or that one or more of the assistant outputs included in the set of assistant outputs determined at block 454 correspond to one or more prior assistant outputs determined based on the prior query. Further, the system can obtain the one or more LLM outputs (e.g., using the online output modification engine 180) that are indexed based on the prior assistant query, the prior context, and/or the one or more prior assistant outputs that correspond to the assistant query, the context, and/or one or more of the assistant outputs included in the set of assistant outputs, respectively, as described with respect with respect to the method 300 of FIG. 3, and utilize the one or more LLM outputs as the set of modified assistant outputs.

In additional or alternative implementations, in generating the set of modified assistant outputs, the system can process at least the context of the dialog session and/or the one or more assistant outputs included in the set of assistant outputs in an online manner (e.g., in response to receiving the spoken utterance and using the online output modification engine 180) to generate the one or more LLM outputs. For example, the system can cause the LLM engine 150A1 and/or 150A2 to process, using one or more LLMs, the context of the dialog session, the assistant query, and/or the one or more assistant outputs included in the set of assistant outputs to generate the set of modified assistant outputs. The one or more LLM outputs can be generated in an online manner in the same or similar manner as described above with respect to block 354 of the method 300 of FIG. 3 with respect to generating the one or more LLM outputs in an offline manner, but in response to spoken utterance being received at the client device. For example, the system can process, using the one or more LLMs, the one or more assistant outputs included in the set of assistant outputs to generate one or more personality replies for each of the one or more assistant outputs included in the set of assistant outputs as described above with respect to block 354 of the method 300 of FIG. 3. Put another way, each of the assistant outputs included in the set of assistant outputs may have a limited vocabulary and a consistent personality in terms of prosodic properties associated with each of the assistant outputs. However, in processing each of the each of the assistant outputs included in the set of assistant outputs to generate the set of modified assistant outputs, each of the modified assistant outputs may have a much larger vocabulary as a function of using the one or more LLMs in generating the one or more modified assistant outputs, and with much greater variance in terms of prosodic properties associated with each of the modified assistant outputs. As a result, each of the modified assistant outputs may correspond to contextually relevant assistant outputs that better resonates with the user engaged in the dialog session with the automated assistant.

Similarly, in some implementations, in generating the additional assistant query, the additional assistant may have been previously generated in an offline manner (e.g., prior to receiving the spoken utterance and using the offline output modification engine 170 as described above with respect to FIG. 3). In these implementations, and similar to described above with respect to obtaining the one or more LLM outputs that were previously generated in an offline manner, the system can obtain the additional assistant query that is indexed based on the prior assistant query, the prior context, and/or the one or more prior assistant outputs that correspond to the assistant query, the context, and/or one or more of the assistant outputs included in the set of assistant outputs, respectively, as described with respect with respect to the method 300 of FIG. 3, and utilize the previously generated additional assistant query as the additional assistant query.

Also, similarly, in additional or alternative implementations, in generating the additional assistant query, the system can process at least the context of the dialog session and/or the one or more assistant outputs included in the set of assistant outputs in an online manner (e.g., in response to receiving the spoken utterance and using the online output modification engine 180) to generate the additional assistant query. For example, the system can cause the LLM engine 150A1 and/or 150A2 to process, using one or more LLMs, the context of the dialog session, the assistant query, and/or the one or more assistant outputs included in the set of assistant outputs to generate the additional assistant query. The additional assistant query can be generated in an online manner in the same or similar manner as described above with respect to block 354 of the method 300 of FIG. 3 with respect to generating the additional assistant query in an offline manner, but in response to spoken utterance being received at the client device. In some implementations, the one or more LLMs described herein may have a plurality of disparate layers dedicated to performing certain functions. For example, one or more first layers of the one or more LLMs can be utilized in generating the personality replies described herein, and one or more second layers of the one or more LLMs can be utilized in generating the additional assistant queries described herein. In additional or alternative implementations, the one or more LLMs can communicate with one or more additional layers that are not included in the one or more LLMs in generating the additional assistant queries described herein. For example, one or more layers of the one or more LLMs can be utilized in generating the personality replies described herein, and one or more additional layers of another ML model in communication with the one or more LLMs can be utilized in generating the additional assistant queries described herein.

A non-limiting example of the personality replies and additional assistant queries are described in more detail with respect to FIG. 6 below.

At block 458, the system determines, based on the additional assistant query, additional assistant output that is responsive to the additional assistant query. In some implementations, the system can cause the additional assistant query to be processed by one or more of the 1P systems 191 and/or the 3P systems 192 in the same or similar manner described with respect to processing the assistant query in FIG. 2 to generate the additional assistant output. In some implementations, the additional assistant output may be a single additional assistant output, whereas in other implementations, the additional assistant output may be included in a set of additional assistant outputs (e.g., similar to the set of the additional assistant outputs 205 of FIG. 2). In additional or alternative implementations, the additional assistant query may be mapped directly to the additional assistant output based on, for example, user profile data of the user that provided the spoken utterance and/or any other data accessible to the automated assistant.

At block 460, the system processes, based on the additional assistant output that is responsive to the additional assistant query, the set of modified assistant outputs to generate a set of additional modified assistant outputs. In some implementations, the system may prepend or append the additional assistant output to one or more of the modified assistant outputs to each of the one or more assistant outputs included in the set of modified assistant outputs generated at block 456. In additional or alternative implementations, and as indicated at block 460A, the system may process the additional assistant output and the context of the dialog session to generate a set of additional modified assistant outputs using one or more of the LLM outputs utilized at block 456 and/or one or more additional LLM outputs, that are in addition to the one or more LLM outputs utilized at block 456, that are generated based on at least part of the context of the dialog session and at least part of the additional assistant output. The set of additional modified assistant outputs can be generated in the same or similar manner described above with respect to generating the set of modified assistant outputs, but based on the additional assistant outputs rather than the set of assistant outputs (e.g., using the one or more LLM outputs generated in the offline manner and/or using the LLM engine 150A1 and/or 150A2 in an online manner).

At block 462, the system causes given modified assistant output, from the set of modified assistant outputs, and/or given additional modified assistant output, from the set of additional modified assistant outputs, to be provided for presentation to the user. In some implementations, the system may cause the ranking engine 190 to rank, according to one or more ranking criteria, each of the one or more modified assistant outputs included in the set of modified assistant outputs (and optionally each of the one or more assistant outputs included in the set of assistant outputs), and select the given modified assistant output from the set of modified assistant outputs (or given assistant output from the set of assistant outputs). Further, the system may further cause the ranking engine 190 to rank, according to the one or more ranking criteria, each of the one or more additional modified assistant outputs included in the set of additional modified assistant outputs (and optionally the additional assistant output), and select the given additional modified assistant output from the set of additional modified assistant outputs (or the additional assistant output as the given additional assistant output). In these implementations, the system can combine the given modified assistant output and the given additional assistant output, and cause the given modified assistant output and the given additional assistant output to be provided for visual and/or audible presentation to the user of the client device that is engaged in the dialog session with the automated assistant.

Figure 5:
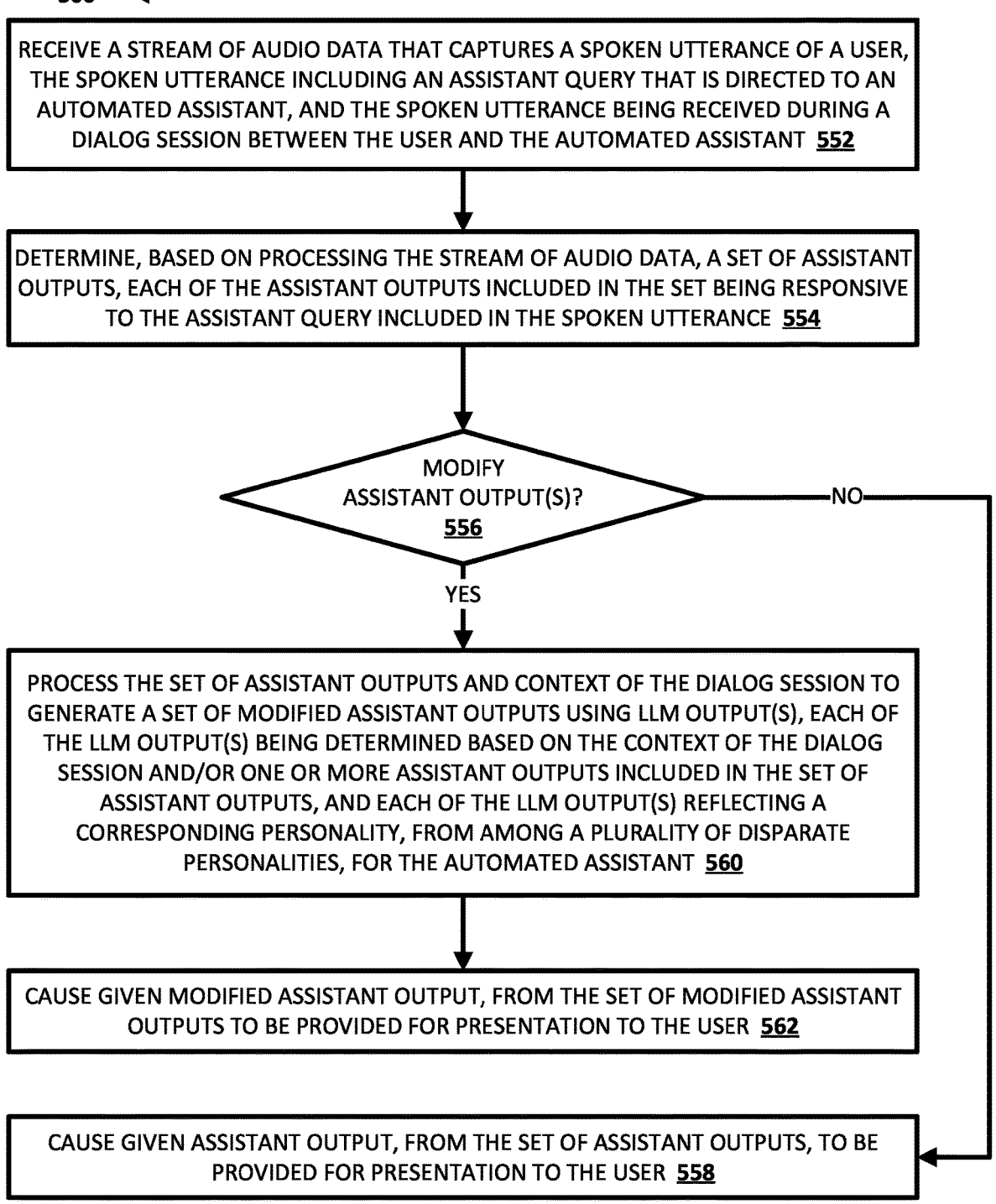
FIG. 5 depicts a flowchart illustrating an example method of utilizing large language models in generating assistant output(s) based on generating an assistant personality reply, in accordance with various implementations.

Turning now to FIG. 5, a flowchart illustrating an example method 500 of utilizing large language models in generating assistant output(s) based on generating an assistant personality reply is depicted. For convenience, the operations of the method 500 are described with reference to a system that performs the operations from the process flow 200 of FIG. 2. This system of the method 500 includes one or more processors, memory, and/or other component(s) of computing device(s) (e.g., client device 110 of FIG. 1, client device 610 of FIG. 6, and/or computing device 710 of FIG. 7, one or more servers, and/or other computing devices). Moreover, while operations of the method 500 are shown in a particular order, this is not meant to be limiting. One or more operations may be reordered, omitted, and/or added.

At block 552, the system receives a stream of audio data that captures a spoken utterance of a user, the spoken utterance including an assistant query that is directed to an automated assistant, and the spoken utterance being received during a dialog session between the user and the automated assistant. At block 554, the system determines, based on processing the stream of audio data, a set of assistant outputs, each of the assistant outputs included in the set being responsive to the assistant query included in the spoken utterance. The operations of blocks 552 and 554 of the method 500 of FIG. 5 can be performed in the same or similar manner described with respect to block 452 and 454 of the method 400 of FIG. 4, respectively.

At block 556, the system determines whether to modify one or more assistant outputs included in the set of assistant outputs. The system can determine whether to modify the one or more assistant outputs based on, for example, an intent of the user in providing the spoken utterance (e.g., included in the stream of NLU output 204), the one or more assistant outputs included in the set of assistant outputs (e.g., the set of assistant outputs 205), one or more computational costs associated with modifying one or more of the assistant outputs included in the set of assistant outputs (e.g., battery consumption, processor consumption, latency, etc.), a duration of time of interacting with the automated assistant, and/or other considerations. For example, if the intent of the user indicates that the user that provided the spoken utterance is expecting a quick and/or factual answer (e.g., "why is the sky blue?", "what's the weather?", "what time is it", etc.), in some instances, the system may determine not to modify one or more of the assistant outputs to reduce latency and consumption of computational resources in providing content that is responsive to the spoken utterance. Also, for example, if the client device of the user is in a power saving mode, the system may determine not to modify one or more of the assistant outputs to conserve battery power. Also, for example, if the user has been engaged in the dialog with session with a duration of time that exceeds a threshold duration of time (e.g., 30 seconds, 1 minute, etc.), then the system may determine to not modify one or more of the assistant outputs in an attempt to conclude the dialog session in a more quick and efficient manner.

If, at an iteration of block 556, the system determines not to modify one or more of the assistant outputs included in the set of assistant outputs, then the system may proceed to block 558. At block 558, the system causes given assistant output, from the set of assistant outputs to be provided for presentation to the user. For example, the system can cause the ranking engine 190 to rank, according to one or more ranking criteria, each of the assistant outputs included in the set of assistant outputs, and select, based on the ranking, the given assistant output to be provided for visual and/or audible presentation to the user.

If, at an iteration of block 556, the system determines to modify one or more of the assistant outputs included in the set of assistant outputs, then the system may proceed to block 560. At block 560, the system processes the set of assistant outputs and context of the dialog session to generate a set of modified assistant outputs using one or more LLM outputs, each of the one or more LLM outputs being determined based on the context of the dialog session and/or one or more assistant outputs included in the set of assistant outputs, and each of the one or more LLM outputs reflecting a corresponding personality, from among a plurality of disparate personalities, for the automated assistant. As described with respect to block 354 of the method 300 of FIG. 3, the one or more LLM outputs can be generated using various disparate parameters to reflect different personalities of the automated assistant. In various implementations, each of the LLM outputs can be determined further based on the assistant query included in the spoken utterance that is captured in the stream of audio data. In some implementations, the system may process the set of assistant outputs and the context of the dialog session (and optionally the assistant query) to generate the set of modified assistant outputs using one or more of the LLM outputs that were previously generated in an offline manner as described herein, whereas in additional or alternative implementations, the system may process the set of assistant outputs and the context of the dialog session (and optionally the assistant query) to generate the set of modified assistant outputs in an online manner as described herein. As noted above with respect to the method 400 of FIG. 4, a non-limiting example of the personality replies and additional assistant queries are described in more detail with respect to FIG. 6 below.

At block 562, the system causes given assistant output, from the set of assistant outputs, to be provided for presentation to the user. In some implementations, the system may cause the ranking engine 190 to rank, according to one or more ranking criteria, each of the one or more modified assistant outputs included in the set of modified assistant outputs (and optionally each of the one or more assistant outputs included in the set of assistant outputs), and select the given modified assistant output from the set of modified assistant outputs (or given assistant output from the set of assistant outputs). Further, the system may cause the given modified assistant output to be provided for visual and/or audible presentation to the user.

Although FIG. 5 is not described with respect to generating any additional assistant query, it should be understood that is for the sake of example and is not meant to be limiting. Rather, it should be understood that generating the additional assistant query in the method 400 of FIG. 4 is based on determining that there is contextually relevant additional assistant output that can be provided in furtherance of the dialog session and with respect to providing a more natural conversational experience of the user, such that any assistant output provided for presentation to the user better reflects dialog sessions between humans and such that the dialog session between the user and the automated assistant better resonates with the user. Moreover, although FIGS. 3 and 4 are not described with respect to determining whether to modify the set of assistant outputs, it should also be understood that is for the sake of example and is not meant to be limiting. Rather, it should be understood that determining whether to trigger modification of the set of assistant responses using the one or more LLMs can be performed in any of the example methods of FIGS. 3, 4, and 5.

Figure 6:
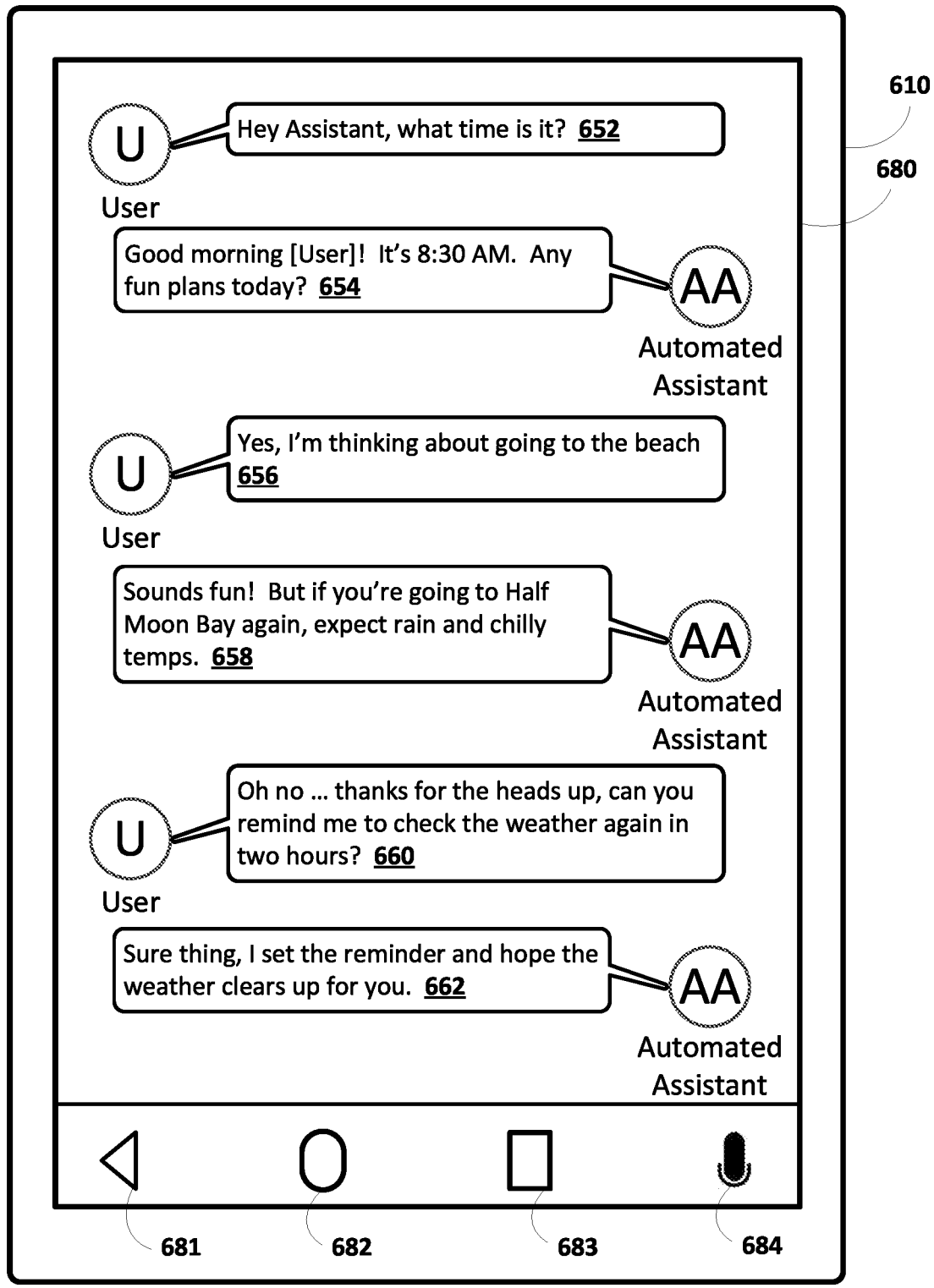
FIG. 6 depicts a non-limiting example of a dialog session between a user and automated assistant where the automated assistant utilizes large language model(s) in generating assistant output(s), in accordance with various implementations.

Turning now to FIG. 6, a non-limiting example of a dialog session between a user and automated assistant where the automated assistant utilizes one or more LLMs in generating assistant outputs is depicted. As described herein, in some implementations, the automated assistant can utilize one or more LLM outputs that were previously generated in an offline manner to generate the set of modified assistant outputs (e.g., as described above with respect to the method 300 of FIG. 3). For example, the automated assistant can determine that a prior assistant query, for which one or more LLM outputs have been previously generated, corresponds to an assistant query included in a spoken utterance, that a prior context of a prior dialog session corresponds to a context of the dialog session between the user and the automated assistant in which the spoken utterance is received, and/or that one or more prior assistant outputs correspond one or more assistant outputs included in a set of assistant outputs for the assistant query included in the spoken utterance. Further, the automated assistant can obtain one or more LLM outputs indexed (e.g., in the LLM output(s) database 150A) according to the prior assistant query, the prior context, and/or one or more of the prior assistant outputs included in the prior set of assistant outputs, and utilize the one or more LLM outputs as the set of modified assistant outputs. In additional or alternative implementations, the automated assistant can cause an assistant query, a context of the dialog session, and/or one or more assistant outputs included in the set of assistant outputs to be processed, using one or more of the LLMs, to generate the one or more LLM outputs to be utilized as a set of modified assistant outputs in an online manner (e.g., as described above with respect to the method 400 of FIG. 4 and the method 500 of FIG. 5). Accordingly, the non-limiting example of FIG. 6 is provided to illustrate how utilization of the LLMs according to techniques described herein result in improved natural conversations between a user and the automated assistant.

A client device 610 (e.g., an instance of the client device 110 of FIG. 1) may include various user interface components including, for example, microphone(s) to generate audio data based on spoken utterances and/or other audible input, speaker(s) to audibly render synthesized speech and/or other audible output, and/or a display 680 to visually render visual output. Further, the display 680 of the client device 610 can include various system interface elements 681, 682, and 683 (e.g., hardware and/or software interface elements) that may be interacted with by a user of the client device 610 to cause the client device 610 to perform one or more actions. The display 680 of the client device 610 enables the user to interact with content rendered on the display 680 by touch input (e.g., by directing user input to the display 680 or portions thereof (e.g., to a text entry box (not depicted), to a keyboard (not depicted), or to other portions of the display 680)) and/or by spoken input (e.g., by selecting microphone interface element 684—or just by speaking without necessarily selecting the microphone interface element 684 (i.e., an automated assistant may monitor for one or more terms or phrases, gesture(s) gaze(s), mouth movement(s), lip movement(s), and/or other conditions to activate spoken input) at the client device 610). Although the client device 610 depicted in FIG. 6 is a mobile phone, it should be understood that is for the sake of example and is not meant to be limiting. For example, the client device 610 may be a standalone speaker with a display, a standalone speaker without a display, a home automation device, an in-vehicle system, a laptop, a desktop computer, and/or any other device capable of executing an automated assistant to engage in a human-to-computer dialog session with the user of the client device 610.

For example, assume a user of the client device 610 provides a spoken utterance 652 of "Hey Assistant, what time is it?". In this example, the automated assistant can cause audio data capturing the spoken utterance 652 to be processed, using the ASR engine 130A1 and/or 130A2, to generate a stream of ASR output. Further, the automated assistant can cause the stream of ASR output to be processed, using the NLU engine 140A1 and/or 140A2, to generate a stream of NLU output. Moreover, the automated assistant can cause the stream of NLU output to be processed by one or more of the 1P systems 191 and/or the 3P systems 192 to generate a set of one or more assistant outputs. The set of assistant outputs can include, for example, "8:30 AM", "Good morning, it's 8:30 AM", and/or any other output that conveys a current time to the user of the client device 610.

In the example of FIG. 6, further assume that the automated assistant determines to modify one or more of the assistant outputs included in the set of assistant outputs to generate a set of modified assistant outputs. For instance, the automated assistant can determine that the assistant query included in the spoken utterance 652 requests that the automated assistant provides a current time for presentation to the user. The automated assistant can determine that an instance of a prior assistant query, for which one or more LLM outputs have been previously generated, requesting that the automated assistant provides a current time for presentation to the user corresponds to the assistant query that is included in the spoken utterance 652 of FIG. 6, that a prior context of a prior dialog session corresponds to a context of the dialog session between the user and the automated assistant in FIG. 6 (e.g., the user requesting that the automated assistant provides a current time in the morning (and optionally making the request by initiating the dialog session), the client device 610 being located at a particular location, and/or other contextual signals), and/or, that one or more prior assistant outputs correspond one or more of the assistant outputs included in the set of assistant outputs for the assistant query included in the spoken utterance 652 of FIG. 6. Further, the automated assistant can obtain one or more LLM outputs indexed (e.g., in the LLM output(s) database 150A) according to the prior assistant query, the prior context, and/or one or more of the prior assistant outputs included in the prior set of assistant outputs, and utilize the one or more LLM outputs as the set of modified assistant outputs. Also, for instance, the automated assistant can cause the assistant query, the context of the dialog session, and/or one or more of the assistant outputs included in the set of assistant outputs to be processed, using one or more LLMs, to generate the one or more LLM outputs to be utilized as the set of modified assistant outputs in an online manner.

In the example of FIG. 6, further assume that the automated assistant determines to provide a modified assistant output 654 of "Good morning [User]! It's 8:30 AM. Any fun plans today?" for presentation to the user, where the modified assistant output 654 is determined based on one or more of the LLM outputs. The modified assistant output 654 provided for presentation to the user is personalized or tailored to the user of the client device 610 and the context of the dialog session in that the modified assistant output 654 greets the user with a contextually appropriate greeting (e.g., "Good Morning") and calls the user of the client device 610 by name (e.g., "[User]"). Notably, one or more of the LLM outputs can include one or more corresponding placeholders (e.g., as indicated by "[User]!" in the modified assistant output 654) that can be populated with user profile data accessible to the automated assistant. Although the example of FIG. 6 includes a corresponding placeholder for a name of the user of the client device 610, it should be understood that is for the sake of example and is not meant to be limiting. For instance, one or more of the corresponding placeholders can be populated with any data that is accessible to the automated assistant, such as smart networked device identifiers (e.g., smart light(s), a smart TV, a smart appliance, smart speakers, a smart door lock, etc.), known locations associated with the user of the client device 610 (e.g., city, state, county, region, province, country, a physical address of a place of work, business of the user, or primary dwelling of the user of the client device 610, etc.), entity references (e.g., referencing persons, places, things, etc.), software application accessible at the client device 610 of the user, and/or any other data that is accessible to the automated assistant.

Moreover, the modified assistant output 654 is functional in terms of responding to the assistant query that is included in the spoken utterance 652 (e.g., "It's 8:30 AM"). However, not only is the modified assistant output 654 personalized or tailored to the user and functional in terms of responding to the assistant query, but the modified assistant output 654 also helps drive the dialog session between the user and the automated assistant by further engaging the user in the dialog session (e.g., "Any fun plans today?"). Absent using the techniques described herein with respect to using the one or more LLM outputs in modifying the originally generated set of assistant outputs based on processing the spoken utterance 652, the automated assistant may simply reply "It's 8:30 AM" without providing any greeting to the user of the client device 610 (e.g., "Good morning"), without addressing the user of the client device 610 by name (e.g., "[Used]"), and without further engaging the user of the client device 610 in the dialog session (e.g., "Any fun plans today?"). Accordingly, the modified assistant output 654 may resonate better with the user of the client device 610 than any of the assistant outputs included in the originally generated set of assistant outputs that do not utilize the one or more LLM outputs.

In the example of FIG. 6, further assume that the user of the client device 610 provides a spoken utterance 656 of "Yes, I'm thinking about going to the beach". In this example, the automated assistant can cause audio data capturing the spoken utterance 656 to be processed to generate a set of assistant outputs that are generated without using one or more LLM outputs. Further, the automated assistant can cause an assistant query included in the spoken utterance 656, the set of assistant outputs, and/or the context of the dialog session to be processed to generate a set of modified assistant outputs that are determined using one or more LLM outputs (e.g., in an offline and/or online manner), and optionally generate an additional assistant query based on the assistant query.

In this example, the assistant outputs that are included in the set of assistant outputs (i.e., that are generated without using one or more LLM outputs) may be limited since the assistant query included in the spoken utterance 656 does not request that the automated assistant perform any action. For instance, the assistant outputs that are included in the set of assistant outputs may include "Sounds fun!", "Surf's up!", "That sounds like fun!", and/or other assistant outputs that are responsive to the spoken utterance 656, but do not further engage the user of the client device 610 in the dialog session. Put another way, the assistant outputs that are included in the set of assistant outputs may be limited in terms of variance in a vocabulary since the assistant outputs are not generated using one or more LLM outputs as described herein. Nonetheless, the automated assistant can leverage the assistant outputs that are included in the set of assistant outputs to determine how to modify one or more of the assistant outputs using one or more of the LLM outputs.

Moreover, and as described with respect to FIGS. 3 and 4, the automated assistant can generate the additional assistant query based on the assistant query, and using one or more of the LLMs or a distinct ML model in communication with one or more of the LLMs. For instance, in the example of FIG. 6, the spoken utterance 656 provided by the user of the client device 610 indicates that the user is going to the beach. Based on identifying an intent associated with the spoken utterance 656 indicates the user intends to go to the beach, the automated assistant can determine a related intent associated with looking up weather for a beach that the user of the client device 610 frequently visits (e.g., an example beach named "Half Moon Bay"). Based on identifying the related intent, the automated assistant can generate the additional assistant query of "What's the weather?" with a location parameter of "Half Moon Bay", submit the query to one or more of the 1P systems 191 and/or 3P systems 192 to obtain additional assistant output that includes the "weather" for "Half Moon Bay" that indicates, for example, that it will rain and there will chilly temperatures throughout the day at "Half Moon Bay". In some implementations, the automated assistant can cause the additional assistant output and/or the context of the dialog session to be processed to generate a set of additional modified assistant outputs that are determined using one or more of the LLM outputs and/or one or more additional LLM outputs.

In the example of FIG. 6, the automated assistant can cause the assistant outputs included in the set of assistant outputs and the set of modified assistant outputs to be ranked, according to one or more ranking criteria, and can select one or more of the assistant outputs based on the ranking (e.g., select given assistant output of "Sounds fun!"). Further, the automated assistant can cause the assistant outputs included in the set of additional modified assistant outputs and the additional assistant output to be ranked, according to one or more ranking criteria, and can select one or more of the assistant outputs based on the ranking (e.g., select given additional assistant output of "But if you're going to Half Moon Bay again, expect rain and chilly temps."). Moreover, the automated assistant can combine the selected given assistant output and the selected given additional assistant output, resulting in modified assistant output of 658 of "Sounds fun! But if you're going to Half Moon Bay again, expect rain and chilly temps", and can cause the modified assistant output 658 to be provided for visual and/or audible presentation to the user of the client device 610. Accordingly, in this example, the automated assistant can process the spoken utterance 656, and provide additional contextual information associated with the spoken utterance (e.g., the weather at the beach that the user of the client device 610 is likely to visit) to further engage the user of the client device 610 in the dialog session. Absent the techniques described herein, the user of the client device 610 may be required to proactively request the weather information from the automated assistant despite the automated assistant being capable of determining and providing the weather information, thereby increasing a quantity of user inputs and wasting computational resources at the client device 610 in processing the increased quantity of user inputs, and also increasing a cognitive load of the user of the client device 610.

In the example of FIG. 6, further assume that the user of the client device 610 provides a spoken utterance 660 of "Oh no . . . thanks for the heads up, can you remind me to check the weather again in two hours?". In this example, the automated assistant can cause audio data capturing the spoken utterance 660 to be processed to generate a set of assistant outputs that are generated without using one or more LLM outputs. Further, the automated assistant can cause an assistant query included in the spoken utterance 660, the set of assistant outputs, and/or the context of the dialog session to be processed to generate a set of modified assistant outputs that are determined using one or more LLM outputs (e.g., in an offline and/or online manner). Based on processing the spoken utterance 660, the automated assistant can determine to set a reminder for 10:30 AM (e.g., two hours after the dialog session) that reminds the user of the client device 610 to check the weather at "Half Moon Bay", or proactively provide the weather at "Half Moon Bay" to the user of the client device 610 at 10:30 AM. Further, the automated assistant can cause modified assistant output 662, from the set of modified assistant outputs (i.e., that are generated using one or more LLM outputs), of "Sure thing, I set the reminder and hope the weather clears up for you" to be provided for visual and/or audible presentation to the user of the client device 610. Notably, the modified assistant output 662 in the example of FIG. 6 is contextual with respect to the dialog session in that it indicates to the user a desire for the weather to clear up. In contrast, the assistant outputs included in the set of assistant outputs (i.e., that are generated without using one or more of the LLM outputs), may only provide an indication that the reminder was set without considering the context of the dialog session.

Although FIG. 6 is described with respect to generating particular modified assistant outputs, using one or more LLM outputs and based on particular spoken utterances and contexts of the dialog session, and selecting the particular modified assistant outputs to be provided for presentation to the user, it should be understood that this is for the sake of example and are not meant to be limiting. Rather, it should be understood that the techniques described herein can be utilized for any dialog session between any user and a corresponding instance of the automated assistant. Further, although a transcription corresponding to the dialog session between the user and the automated assistant is depicted at the display 680 of the client device 610, it should also be understood that is for the sake of example and is not meant to be limiting. For instance, it should be understood that the dialog session can be performed at any device capable of executing the automated assistant and regardless of whether the client device includes a display.

Moreover, it should also be understood that the assistant outputs provided for presentation to the user in the dialog session of FIG. 6 can include various personality replies described herein. For example, the modified assistant output 654 can be generated using a first set of parameters that reflect a first personality of the automated assistant in terms of a first vocabulary to be utilized by the automated assistant and/or a first set of prosodic properties to be utilized in providing the modified assistant output 654 for audible presentation to the user. Further, the modified assistant output 658 can be generated using a second set of parameters that reflect a second personality of the automated assistant in terms of a second vocabulary to be utilized by the automated assistant and/or a second set of prosodic properties to be utilized in providing the modified assistant output 658 for audible presentation to the user. In this example, the first personality can reflect that of, for instance, a butler or maid that is utilized to provide the morning greeting, respond to the user requesting the current time, and asking the user if he/she has any plans for the day. Further, the second personality can reflect that of, for instance, a weatherman, a surfer, or a lifeguard (or a combination thereof) that is utilized to indicate that going to the beach sounds fun, but that the weather may not be ideal for a day at the beach. For instance, the surfer personality may be utilized to provide the "Sounds fun!" portion of the modified assistant output 658 since the user indicated that he/she plans on going to the beach, and the weatherman personality may be utilized to provide the "But if you're going to Half Moon Bay again, expect rain and chilly temps" since the automated assistant is providing the weather information to the user.

Accordingly, the automated assistant can dynamically adapt the personalities utilized in providing the modified assistant outputs for presentation to the user based on both the vocabulary utilized by the automated assistant and the prosodic properties utilized in rendering the modified assistant outputs for audible presentation to the user. Notably, the automated assistant can dynamically adapt these personalities utilized in providing the modified assistant outputs based on the context of the dialog session, including prior spoken utterances received from the user and prior assistant outputs provided by the automated assistant and/or any other contextual signals described herein. As a result, the modified assistant outputs provided by the automated assistant may better resonate with the user of the client device.

Moreover, although FIG. 6 is described herein with respect to the user providing spoken utterances throughout the dialog session, it should be understood that is for the sake of example and is not meant to be limiting. For example, the user can additionally or alternatively provide typed input and/or touch input throughout the dialog session. In these implementations, the automated assistant can process the typed input (e.g., using the NLU engine 140A1 and/or 140A2) to generate the stream of NLU output (e.g., and optionally skipping any processing using the ASR engine 130A1 and/or 130A2), and can process the stream of NLU data and textual input corresponding to the assistant query that is derived from the typed input and/or touch input (e.g., using the LLM engine 150A1 and/or 150A2) in generating the set of one or more modified assistant outputs in the same or similar manner described above.

Figure 7:
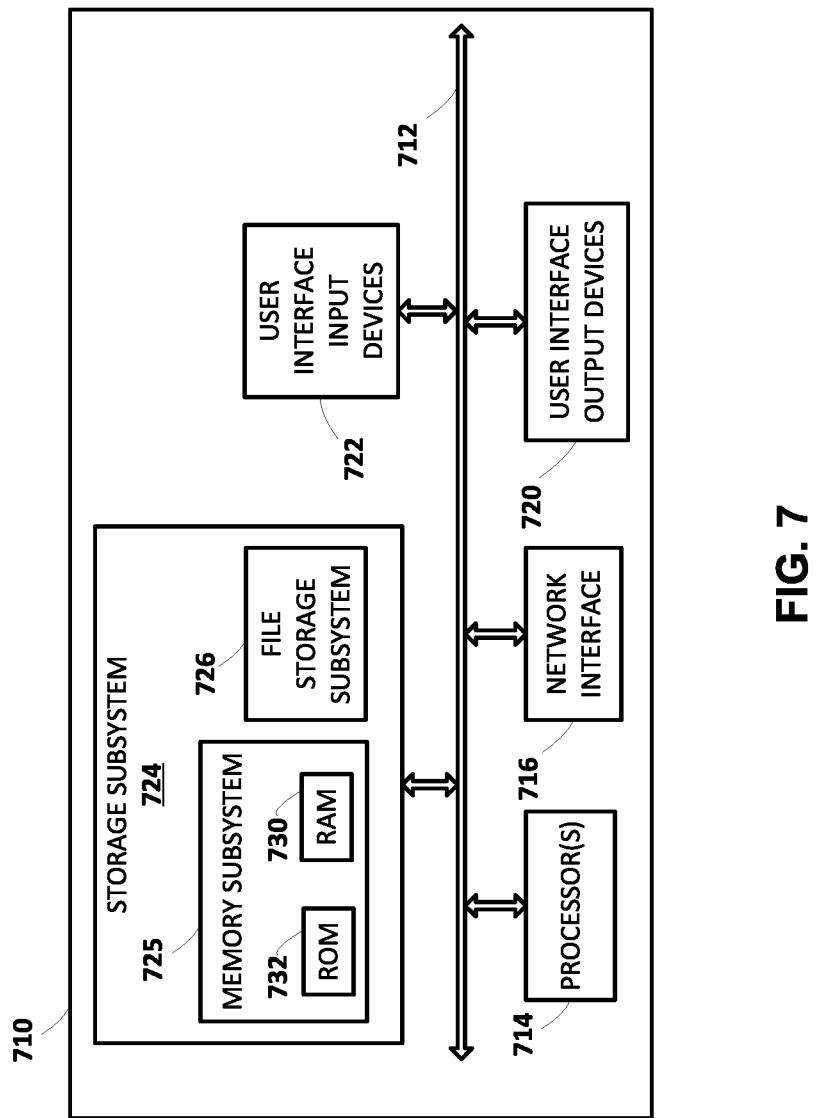
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more of a client device, cloud-based automated assistant component(s), and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes, as part of a dialog session between a user of a client device and an automated assistant implemented by the client device: receiving a stream of audio data that captures a spoken utterance of the user, the stream of audio data being generated one or more microphones of the client device, and the spoken utterance including an assistant query; determining, based on processing the stream of audio data, a set of assistant outputs, each assistant output in the set of assistant outputs being responsive to the assistant query included in the spoken utterance; processing the set of assistant outputs and context of the dialog session to: generate a set of modified assistant outputs using one or more large language model (LLM) outputs generated using an LLM, each of the one or more LLM outputs being determined based on at least part of the context of the dialog session and one or more of the assistant outputs included in the set of assistant outputs, and generate an additional assistant query that is related to the spoken utterance based on at least part of the context of the dialog session and at least part of the assistant query; determining, based on the additional assistant query, additional assistant output that is responsive to the additional assistant query; processing the additional assistant output and the context of the dialog session to generate a set of additional modified assistant outputs using one or more of the LLM outputs or one or more additional LLM outputs generated using the LLM, each of the additional LLM outputs being determined based on at least part of the context of the dialog session and the additional assistant output; and causing given modified assistant output, from the set of modified assistant outputs, and given additional modified assistant output, from the set of additional modified assistant outputs, to be provided for presentation to the user.

These and other implementations of technology disclosed herein can optionally include one or more of the following features.

In some implementations, determining the assistant output that is responsive to the assistant query included in the spoken utterance based on processing the stream of audio data may include processing, using an automatic speech recognition (ASR) model, the stream of audio data to generate a stream of ASR output; processing, using a natural language understanding (NLU) model, the stream of ASR output to generate a stream of NLU data; and causing the set of assistant outputs to be determined based on the stream of NLU.

In some versions of those implementations, processing the set of assistant outputs and the context of the dialog session to generate the set of modified assistant outputs using one or more of the LLM outputs generated using the LLM may include processing, using the LLM, the set of assistant outputs and the context of the dialog session to generate one or more of the LLM outputs; and determining the set of modified assistant outputs based on one or more of the LLM outputs. In some further versions of those implementations, processing, the set of assistant outputs and the context of the dialog session to generate one or more of the LLM outputs using the LLM may include processing the set of assistant outputs and the context of the dialog session using a first set of LLM parameters, of a plurality of disparate sets of LLM parameters, to determine one or more of the LLM outputs having a first personality, of a plurality of disparate personalities. The set of modified assistant outputs may include one or more first personality assistant outputs that reflect the first personality. In yet further versions of those implementations, processing, the set of assistant outputs and the context of the dialog session to generate one or more of the LLM outputs using the LLM may include processing the set of assistant outputs and the context of the dialog session using a second set of LLM parameters, of a plurality of disparate sets of LLM parameters, to determine one or more of the LLM outputs having a second personality, of a plurality of disparate personalities. The set of modified assistant outputs may include one or more second personality assistant outputs that reflect the second personality, and the second personality may be unique from the first personality. In even yet further versions of those implementations, the one or more first personality assistant outputs that are included in the set of modified assistant outputs and that reflect the first personality may be determined using a first vocabulary associated with the first personality, and the one or more second personality assistant outputs that are included in the set of modified assistant outputs and that reflect the second personality may be determined using a second vocabulary associated with the second personality, and wherein the second personality is unique from the first personality based on the second vocabulary being unique from the first vocabulary. In yet further additional or alternative versions of those implementations, the one or more first personality assistant outputs that are included in the set of modified assistant outputs and that reflect the first personality may be associated with a first set of prosodic properties utilized in providing the given modified assistant output for audible presentation to the user, the one or more second personality assistant outputs that are included in the set of modified assistant outputs and that reflect the second personality may be associated with a second set of prosodic properties utilized in providing the given modified assistant output for audible presentation to the user, and the second personality may be unique from the first personality based on the second set of prosodic properties being unique from the first set of prosodic properties.

In some versions of those implementations, processing the set of assistant outputs and the context of the dialog session to generate the set of modified assistant outputs using one or more of the LLM outputs generated using the LLM may include identifying one or more of the LLM outputs previously generated using the LLM model based on one or more of the LLM outputs being previously generated based on a prior assistant query of a prior dialog session corresponding to the assistant query of the dialog session and/or based on one or more of the LLM outputs being previously generated for a prior context of the prior dialog session corresponding to the context of the dialog session; and causing the set of assistant outputs to be modified with one or more of the LLM outputs to determine the set of modified assistant outputs. In some further versions of those implementations, identifying one or more of the LLM outputs previously generated using the LLM model may include identifying one or more first LLM outputs, of the one or more LLM outputs, that reflect a first personality, of a plurality of disparate personalities. The set of modified assistant outputs may include one or more first personality assistant outputs that reflect the first personality. In yet further versions of those implementations, identifying one or more of the LLM outputs previously generated using the LLM model may include identifying one or more second LLM outputs, of the one or more LLM outputs, that reflect a second personality, of a plurality of disparate personalities. The set of modified assistant outputs may include one or more second personality assistant outputs that reflect the second personality, and the second personality may be unique from the first personality. In yet further additional or alternative versions of those implementations, the method may further include determining that the prior assistant query of the prior dialog session corresponds to the assistant query of the dialog session based on the ASR output including one or more terms of the assistant query that correspond to one or more terms of the prior assistant query of the prior dialog session. In yet further additional or alternative versions of those implementations, the method may further include generating, based on one or more terms in the ASR output that correspond to the assistant query, an embedding of the assistant query; and determining that the prior assistant query of the prior dialog session corresponds to the assistant query of the dialog session based on comparing the embedding of the assistant query to a previously generated embedding of the prior assistant query of the prior dialog session. In yet further additional or alternative versions of those implementations, the method may further include determining that the prior context of the prior dialog session corresponds to the context of the dialog session based on one or more contextual signals of the dialog session corresponding to one or more contextual signals of the prior dialog session. In even yet further versions of those implementations, the one or more contextual signals may include one or more of: a time of day, a day of week, a location of the client device, ambient noise in an environment of the client device. In yet further additional or alternative versions of those implementations, the method may further include generating, based on contextual signals of the dialog session, an embedding of the context of the dialog session; and determining that the prior context of the prior dialog session corresponds to the context of the dialog session based on comparing the embedding of the one or more contextual signals to a previously generated embedding of the prior context of the prior dialog session.

In some versions of those implementations, processing the set of assistant outputs and the context of the dialog session to generate the additional assistant query that is related to the spoken utterance based on at least part of the context of the dialog session and at least part of the assistant query may include determining, based on the NLU output, an intent associated with the assistant query that is included in the spoken utterance; identifying, based on the intent associated with the assistant query that is included in the spoken utterance, at least one related intent that is related to the intent associated with the assistant query that is included in the spoken utterance; and generating the additional assistant query that is related to the spoken utterance based on the at least one related intent. In some further versions of those implementations, determining the additional assistant output that is responsive to the additional assistant query based on the additional assistant query may include causing the additional assistant query to be transmitted to one or more first-party systems via an application programming interface (API) to generate the additional assistant output that is responsive to the additional assistant query. In some additional or alternative further versions of those implementations, determining the additional assistant output that is responsive to the additional assistant query based on the additional assistant query may include causing the additional assistant query to be transmitted to one or more third-party systems over one or more networks; and receiving, responsive to the additional assistant query being transmitted to one or more of the third-party systems, the additional assistant output that is responsive to the additional assistant query. In some additional or alternative further versions of those implementations, processing the additional assistant output and the context of the dialog session to generate the set of additional modified assistant outputs using one or more of the LLM outputs or one or more of the additional LLM outputs determined using the LLM may include processing, using the LLM, the set of additional assistant outputs and the context of the dialog session to determine one or more of the additional LLM outputs; and determining the set of additional modified assistant outputs based on one or more of the additional LLM outputs. In some additional or alternative further versions of those implementations, processing the additional assistant output and the context of the dialog session to generate the set of additional modified assistant outputs using one or more of the LLM outputs or one or more of the additional LLM outputs determined using the LLM may include identifying one or more of the additional LLM outputs previously generated using the LLM model based on one or more of the additional LLM outputs being previously generated based on a prior assistant query of a prior dialog session corresponding to the additional assistant query of the dialog session and/or based on one or more of the additional LLM outputs being previously generated for a prior context of the prior dialog session that corresponds to the context of the dialog session; and causing the set of additional assistant outputs to be modified with one or more of the additional LLM outputs to generate the set of additional modified assistant outputs.

In some implementations, the method may further include ranking, based on one or more ranking criteria, a superset of assistant outputs, the superset of assistant outputs including at least the set of assistant outputs and the set of modified assistant outputs; and selecting, based on the ranking, the given modified assistant output, from the set of modified assistant outputs. In some versions of those implementations, the method may further include ranking, based on one or more of the ranking criteria, a superset of additional assistant outputs, the superset of assistant outputs including at least the additional assistant output and the set of additional modified assistant outputs; and selecting, based on the ranking, the given additional modified assistant output, from the set of additional modified assistant outputs. In some further versions of those implementations, causing the given modified assistant output and the given additional modified assistant output to be provided for presentation to the user may include combining the given modified assistant output and the given additional modified assistant output; processing, using a text-to-speech (TTS) model, the given modified assistant output and the given additional modified assistant output to generate synthesized speech audio data including synthesized speech that captures the given modified assistant output and the given additional modified assistant output; and causing the synthesized speech audio data to be audibly rendered for presentation to the user via a speaker of the client device.

In some implementations, the method may further include ranking, based on one or more ranking criteria, a superset of assistant outputs, the superset of assistant outputs including the set of assistant outputs, the set of modified assistant outputs, the additional assistant output, and the set of additional modified assistant outputs; and selecting, based on the ranking, the given modified assistant output, from the set of modified assistant outputs, and the given additional modified assistant output, from the set of additional modified assistant outputs. In some further versions of those implementations, causing the given modified assistant output and the given additional modified assistant output to be provided for presentation to the user may include processing, using a text-to-speech (TTS) model, the given modified assistant output and the given additional modified assistant output to generate synthesized speech audio data including synthesized speech that captures the given modified assistant output and the given additional modified assistant output; and causing the synthesized speech audio data to be audibly rendered for presentation to the user via a speaker of the client device.

In some implementations, generating the set of modified assistant outputs using one or more of the LLM outputs may be further based on processing at least part of the assistant query that is included in the spoken utterance.

In some implementations, a method implemented by one or more processors is provided, and includes, as part of a dialog session between a user of a client device and an automated assistant implemented by the client device: receiving a stream of audio data that captures a spoken utterance of the user, the stream of audio data being generated one or more microphones of the client device, and the spoken utterance including an assistant query; determining, based on processing the stream of audio data, a set of assistant outputs, each assistant output in the set of assistant outputs being responsive to the assistant query included in the spoken utterance; processing the set of assistant outputs and context of the dialog session to: generate a set of modified assistant outputs using one or more large language model (LLM) outputs generated using an LLM, each of the one or more LLM outputs being determined based on at least part of the context of the dialog session and one or more of the assistant outputs included in the set of assistant outputs, and generate an additional assistant query that is related to the spoken utterance based on at least part of the context of the dialog session and at least part of the assistant query; determining, based on the additional assistant query, additional assistant output that is responsive to the additional assistant query; processing, based on the additional assistant output that is responsive to the additional assistant query, the set of modified assistant outputs to generate a set of additional modified assistant outputs; and causing given additional modified assistant output, from among the set of additional modified assistant outputs, to be provided for presentation to the user.

In some implementations, a method implemented by one or more processors is provided, and includes, as part of a dialog session between a user of a client device and an automated assistant implemented by the client device: receiving a stream of audio data that captures a spoken utterance of the user, the stream of audio data being generated one or more microphones of the client device, and the spoken utterance including an assistant query; determining, based on processing the stream of audio data, a set of assistant outputs, each assistant output in the set of assistant outputs being responsive to the assistant query included in the spoken utterance; and processing the set of assistant outputs and context of the dialog session to generate a set of modified assistant outputs using one or more large language model (LLM) outputs generated using an LLM, each of the one or more LLM outputs being determined based on at least part of the context of the dialog session and one or more of the assistant outputs included in the set of assistant outputs. Generating the set of modified assistant outputs using one or more of the LLM outputs include generating, based on (i) the set of assistant outputs, (ii) the context of the dialog session, and (iii) one or more first LLM outputs, of the one or more LLM outputs, that reflect a first personality, of a plurality of disparate personalities, a set of first personality replies. The method further incudes causing given modified assistant output, from among the set of modified assistant outputs, to be provided for presentation to the user.

In some implementations a method implemented by one or more processors is provided, and includes, as part of a dialog session between a user of a client device and an automated assistant implemented by the client device: receiving a stream of audio data that captures a spoken utterance of the user, the stream of audio data being generated one or more microphones of the client device, and the spoken utterance including an assistant query; determining, based on processing the stream of audio data, a set of assistant outputs, each assistant output in the set of assistant outputs being responsive to the assistant query included in the spoken utterance; processing the set of assistant outputs and context of the dialog session to generate a set of modified assistant outputs using one or more large language model (LLM) outputs generated using an LLM, each of the one or more LLM outputs being determined based on at least part of the context of the dialog session and one or more of the assistant outputs included in the set of assistant outputs; and causing given modified assistant output, from among the set of modified assistant outputs, to be provided for presentation to the user.

In some implementations, a method implemented by one or more processors is provided, and includes, as part of a dialog session between a user of a client device and an automated assistant implemented by the client device: receiving a stream of audio data that captures a spoken utterance of the user, the stream of audio data being generated one or more microphones of the client device, and the spoken utterance including an assistant query; determining, based on processing the stream of audio data, a set of assistant outputs, each assistant output in the set of assistant outputs being responsive to the assistant query included in the spoken utterance; determining, based on the processing of the spoken utterance, whether to modify one or more of assistant outputs included in the set of assistant outputs; in response to determining to modify one or more of the assistant outputs included in the set of assistant outputs: processing the set of assistant outputs and context of the dialog session to generate a set of modified assistant outputs using one or more large language model (LLM) outputs generated using an LLM, each of the one or more LLM outputs being determined based on at least part of the context of the dialog session and one or more of the assistant outputs included in the set of assistant outputs; and causing given modified assistant output, from among the set of modified assistant outputs, to be provided for presentation to the user.

These and other implementations of technology disclosed herein can optionally include one or more of the following features.

In some implementations, determining whether to modify one or more of the assistant outputs included in the set of assistant outputs based on the processing of the spoken utterance may include processing, using an automatic speech recognition (ASR) model, the stream of audio data to generate a stream of ASR output; processing, using a natural language understanding (NLU) model, the stream of ASR output to generate a stream of NLU data; identifying, based on the stream of NLU data, an intent of the user in providing the spoken utterance; and determining whether to modify the assistant output based on the intent of the user in providing the spoken utterance.

In some implementations, determining whether to modify one or more of the assistant outputs included in the set of assistant outputs may be further based on one or more computational costs associated with modifying one or more of the assistant outputs. In some versions of those implementations, the one or more computational costs associated with modifying one or more of the assistant outputs may include one or more of: battery consumption, processor consumption associated with modifying one or more of the assistant outputs, or latency associated with modifying one or more of the assistant outputs.

In some implementations, a method implemented by one or more processors is provided, and includes obtaining a plurality of assistant queries that are directed to an automated assistant and a corresponding context of a corresponding prior dialog session for each of the plurality of assistant queries; for each of the plurality of assistant queries: processing, using one or more large language models (LLMs), a given assistant query, of the plurality of assistant queries, to generate corresponding LLM output that is responsive to the given assistant query; and indexing the corresponding LLM output in memory that is accessible at a client device based on the given assistant query and/or the corresponding context of the corresponding prior dialog session for the given assistant query; and subsequent to indexing the corresponding LLM output in the memory that is accessible at the client device, and as part of a current dialog session between a user of a client device and an automated assistant implemented by the client device: receiving a stream of audio data that captures a spoken utterance of the user, the stream of audio data being generated one or more microphones of the client device; determining, based on processing the stream of audio data, that the spoken utterance includes a current assistant query that corresponds to the given assistant query and/or that the spoken utterance is received in a current context of the current dialog session that corresponds to the corresponding context of the corresponding prior dialog session for the given assistant query; and causing the automated assistant to utilize the corresponding LLM output in generating assistant output to be provided for presentation to the user responsive to the spoken utterance.

These and other implementations of technology disclosed herein can optionally include one or more of the following features.

In some implementations, the plurality of assistant queries that are directed to the automated assistant may have been previously submitted by the user via the client device. In some implementations, the plurality of assistant queries that are directed to the automated assistant may have been previously submitted by a plurality of additional users, that are in addition to the user of the client device, via respective client devices.

In some implementations, indexing the corresponding LLM output in the memory that is accessible at the client device may be based on an embedding of the given assistant query generated in processing the given assistant query. In some implementations, indexing the corresponding LLM output in the memory that is accessible at the client device may be based on one or more terms or phrases included in the given assistant query generated in processing the given assistant query. In some implementations, indexing the corresponding LLM output in the memory that is accessible at the client device may be based on an embedding of the corresponding context of the corresponding prior dialog session for the given assistant query. In some implementations, indexing the corresponding LLM output in the memory that is accessible at the client device may be based on one or more contextual signals included in the corresponding context of the corresponding prior dialog session for the given assistant query.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

What is claimed is:

1. A method implemented by one or more processors, the method comprising:
   as part of a dialog session between a user of a client device and an automated assistant implemented by the client device:
      receiving a stream of audio data that captures a spoken utterance of the user, the stream of audio data being generated by one or more microphones of the client device, and the spoken utterance including an assistant query;
      determining, based on processing the stream of audio data, a set of assistant outputs, each assistant output in the set of assistant outputs being responsive to the assistant query included in the spoken utterance, wherein determining the set of assistant outputs comprises:
         processing, using an automatic speech recognition model, the stream of audio data to generate ASR output;
         processing, using a natural language understanding (NLU) model, the ASR output to generate NLU output; and
         causing the set of assistant outputs to be determined based on the NLU output;
      processing the set of assistant outputs and context of the dialog session to:
         generate a set of modified assistant outputs using one or more large language model (LLM) outputs generated using an LLM, each of the one or more LLM outputs being determined by processing, using the LLM, at least part of the context of the dialog session and one or more of the assistant outputs included in the set of assistant outputs, and
         generate an additional assistant query that is related to the spoken utterance based on at least part of the context of the dialog session and at least part of the assistant query, wherein generating the additional assistant query that is related to the spoken utterance comprises:
            determining, based on the NLU output, an intent associated with the assistant query that is included in the spoken utterance;
            identifying, based on the intent associated with the assistant query at least one related intent that is related to the intent associated with the assistant query that is included in the spoken utterance; and
            generating the additional assistant query that is related to the spoken utterance based on the at least one related intent;
      determining, based on the additional assistant query, additional assistant output that is responsive to the additional assistant query;
      processing, based on the additional assistant output that is responsive to the additional assistant query, the set of modified assistant outputs to generate a set of additional modified assistant outputs; and
      causing a given additional modified assistant output, from the set of additional modified assistant outputs, to be provided for presentation to the user.

2. The method of claim 1, wherein processing the set of assistant outputs and the context of the dialog session to generate the set of modified assistant outputs comprises:
   processing, using the LLM, the set of assistant outputs and the context of the dialog session to generate one or more of the LLM outputs; and
   determining the set of modified assistant outputs based on one or more of the LLM outputs.

3. The method of claim 2, wherein processing the set of assistant outputs and the context of the dialog session to generate one or more of the LLM outputs using the LLM comprises:
   processing the set of assistant outputs and the context of the dialog session using a first set of LLM parameters, of a plurality of disparate sets of LLM parameters, to determine one or more of the LLM outputs having a first personality, of a plurality of disparate personalities,
   wherein the set of modified assistant outputs include one or more first personality assistant outputs that reflect the first personality.

4. The method of claim 3, wherein processing the set of assistant outputs and the context of the dialog session to generate one or more of the LLM outputs using the LLM comprises:
   processing the set of assistant outputs and the context of the dialog session using a second set of LLM parameters, of a plurality of disparate sets of LLM parameters, to determine one or more of the LLM outputs having a second personality, of a plurality of disparate personalities,
   wherein the set of modified assistant outputs include one or more second personality assistant outputs that reflect the second personality, and
   wherein the second personality is unique from the first personality.

5. The method of claim 4, wherein the one or more first personality assistant outputs that are included in the set of modified assistant outputs and that reflect the first personality are determined using a first vocabulary associated with the first personality, wherein the one or more second personality assistant outputs that are included in the set of modified assistant outputs and that reflect the second personality are determined using a second vocabulary associated with the second personality, and wherein the second personality is unique from the first personality based on the second vocabulary being unique from the first vocabulary.

6. The method of claim 4, wherein the one or more first personality assistant outputs that are included in the set of modified assistant outputs and that reflect the first personality are associated with a first set of prosodic properties utilized in providing the given additional modified assistant output for audible presentation to the user, wherein the one or more second personality assistant outputs that are included in the set of modified assistant outputs and that reflect the second personality are associated with a second set of prosodic properties utilized in providing the given additional modified assistant output for audible presentation to the user, and wherein the second personality is unique from the first personality based on the second set of prosodic properties being unique from the first set of prosodic properties.

7. The method of claim 1, wherein determining the additional assistant output that is responsive to the additional assistant query based on the additional assistant query comprises:
  causing the additional assistant query to be transmitted to one or more first-party systems via an application programming interface (API) to generate the additional assistant output that is responsive to the additional assistant query.

8. The method of claim 1, wherein determining the additional assistant output that is responsive to the additional assistant query based on the additional assistant query comprises:
  causing the additional assistant query to be transmitted to one or more third-party systems over one or more networks; and
  receiving, responsive to the additional assistant query being transmitted to one or more of the third-party systems, the additional assistant output that is responsive to the additional assistant query.

9. A system comprising:
at least one processor; and
memory storing instructions that, when executed, cause the at least one processor to be operable to:
  as part of a dialog session between a user of a client device and an automated assistant implemented by the client device:
    receive a stream of audio data that captures a spoken utterance of the user, the stream of audio data being generated by one or more microphones of the client device, and the spoken utterance including an assistant query;
    determine, based on processing the stream of audio data, a set of assistant outputs, each assistant output in the set of assistant outputs being responsive to the assistant query included in the spoken utterance, wherein the instructions to determine the set of assistant outputs comprises instructions to:
      process, using an automatic speech recognition model, the stream of audio data to generate ASR output;
      process, using a natural language understanding (NLU) model, the ASR output to generate NLU output; and
      cause the set of assistant outputs to be determined based on the NLU output;
    process the set of assistant outputs and context of the dialog session to:
      generate a set of modified assistant outputs using one or more large language model (LLM) outputs generated using an LLM, each of the one or more LLM outputs being determined by processing, using the LLM, at least part of the context of the dialog session and one or more of the assistant outputs included in the set of assistant outputs, and
      generate an additional assistant query that is related to the spoken utterance based on at least part of the context of the dialog session and at least part of the assistant query, wherein the instructions to generate the additional assistant query that is related to the spoken utterance comprise instructions to:
        determine, based on the NLU output, an intent associated with the assistant query that is included in the spoken utterance;
        identify, based on the intent associated with the assistant query at least one related intent that is related to the intent associated with the assistant query that is included in the spoken utterance; and
        generate the additional assistant query that is related to the spoken utterance based on the at least one related intent;
    determine, based on the additional assistant query, additional assistant output that is responsive to the additional assistant query;
    process, based on the additional assistant output that is responsive to the additional assistant query, the set of modified assistant outputs to generate a set of additional modified assistant outputs; and
    cause a given additional modified assistant output, from the set of additional modified assistant outputs, to be provided for presentation to the user.

10. The system of claim 9, wherein the instructions to process the set of assistant outputs and the context of the dialog session to generate the set of modified assistant outputs comprise instructions to:
  process, using the LLM, the set of assistant outputs and the context of the dialog session to generate one or more of the LLM outputs; and
  determine the set of modified assistant outputs based on one or more of the LLM outputs.

11. The system of claim 10, wherein the instructions to process the set of assistant outputs and the context of the dialog session to generate one or more of the LLM outputs using the LLM comprise instructions to:
  processing the set of assistant outputs and the context of the dialog session using a first set of LLM parameters, of a plurality of disparate sets of LLM parameters, to determine one or more of the LLM outputs having a first personality, of a plurality of disparate personalities,
  wherein the set of modified assistant outputs include one or more first personality assistant outputs that reflect the first personality.

12. The system of claim 11, wherein the instructions to process the set of assistant outputs and the context of the dialog session to generate one or more of the LLM outputs using the LLM comprise instructions to:
  processing the set of assistant outputs and the context of the dialog session using a second set of LLM parameters, of a plurality of disparate sets of LLM parameters, to determine one or more of the LLM outputs having a second personality, of a plurality of disparate personalities,
  wherein the set of modified assistant outputs include one or more second personality assistant outputs that reflect the second personality, and wherein the second personality is unique from the first personality.

13. The system of claim 12, wherein the one or more first personality assistant outputs that are included in the set of modified assistant outputs and that reflect the first personality are determined using a first vocabulary associated with the first personality, wherein the one or more second personality assistant outputs that are included in the set of modified assistant outputs and that reflect the second personality are determined using a second vocabulary associated with the second personality, and wherein the second personality is unique from the first personality based on the second vocabulary being unique from the first vocabulary.

14. The system of claim 12, wherein the one or more first personality assistant outputs that are included in the set of modified assistant outputs and that reflect the first personality are associated with a first set of prosodic properties utilized in providing the given additional modified assistant output for audible presentation to the user, wherein the one or more second personality assistant outputs that are included in the set of modified assistant outputs and that reflect the second personality are associated with a second set of prosodic properties utilized in providing the given additional modified assistant output for audible presentation to the user, and wherein the second personality is unique from the first personality based on the second set of prosodic properties being unique from the first set of prosodic properties.

15. The system of claim 9, wherein the instructions to determine the additional assistant output that is responsive to the additional assistant query based on the additional assistant query comprise instructions to:
cause the additional assistant query to be transmitted to one or more first-party systems via an application programming interface (API) to generate the additional assistant output that is responsive to the additional assistant query.

16. The system of claim 9, wherein the instructions to determine the additional assistant output that is responsive to the additional assistant query based on the additional assistant query comprise instructions to:
cause the additional assistant query to be transmitted to one or more third-party systems over one or more networks; and
receive, responsive to the additional assistant query being transmitted to one or more of the third-party systems, the additional assistant output that is responsive to the additional assistant query.

17. A non-transitory computer-readable storage medium storing instructions that, when executed, cause at least one processor to be operable to perform operations, the operations comprising:
as part of a dialog session between a user of a client device and an automated assistant implemented by the client device:
receiving a stream of audio data that captures a spoken utterance of the user, the stream of audio data being generated by one or more microphones of the client device, and the spoken utterance including an assistant query;
determining, based on processing the stream of audio data, a set of assistant outputs, each assistant output in the set of assistant outputs being responsive to the assistant query included in the spoken utterance, wherein determining the set of assistant outputs comprises:
processing, using an automatic speech recognition model, the stream of audio data to generate ASR output;
processing, using a natural language understanding (NLU) model, the ASR output to generate NLU output; and
causing the set of assistant outputs to be determined based on the NLU output;
processing the set of assistant outputs and context of the dialog session to:
generate a set of modified assistant outputs using one or more large language model (LLM) outputs generated using an LLM, each of the one or more LLM outputs being determined by processing, using the LLM, at least part of the context of the dialog session and one or more of the assistant outputs included in the set of assistant outputs, and
generate an additional assistant query that is related to the spoken utterance based on at least part of the context of the dialog session and at least part of the assistant query, wherein generating the additional assistant query that is related to the spoken utterance comprises:
determining, based on the NLU output, an intent associated with the assistant query that is included in the spoken utterance;
identifying, based on the intent associated with the assistant query at least one related intent that is related to the intent associated with the assistant query that is included in the spoken utterance; and
generating the additional assistant query that is related to the spoken utterance based on the at least one related intent;
determining, based on the additional assistant query, additional assistant output that is responsive to the additional assistant query;
processing, based on the additional assistant output that is responsive to the additional assistant query, the set of modified assistant outputs to generate a set of additional modified assistant outputs; and
causing a given additional modified assistant output, from the set of additional modified assistant outputs, to be provided for presentation to the user.

* * * * *